(12) United States Patent
Witherbee et al.

(10) Patent No.: US 11,585,486 B2
(45) Date of Patent: Feb. 21, 2023

(54) TELESCOPING BOX SUPPORT

(71) Applicant: Eaton Intelligent Power Limited, Dublin (IE)

(72) Inventors: Martin Lee Witherbee, Godfrey, IL (US); Jacob Lee Johnson, New Baden, IL (US)

(73) Assignee: Eaton Intelligent Power Limited, Dublin (IE)

( * ) Notice: Subject to any disclaimer, the term of this patent is extended or adjusted under 35 U.S.C. 154(b) by 99 days.

(21) Appl. No.: 16/926,747

(22) Filed: Jul. 12, 2020

(65) Prior Publication Data

US 2021/0041059 A1 Feb. 11, 2021

Related U.S. Application Data

(60) Provisional application No. 62/872,996, filed on Jul. 11, 2019.

(51) Int. Cl.
  *F16M 13/02* (2006.01)
  *H02G 3/10* (2006.01)

(52) U.S. Cl.
  CPC ............. *F16M 13/022* (2013.01); *H02G 3/10* (2013.01)

(58) Field of Classification Search
  CPC ......... F16M 13/022; H02G 3/10; H02G 3/125
  USPC ....................................................... 248/544
  See application file for complete search history.

(56) References Cited

U.S. PATENT DOCUMENTS

| | | | |
|---|---|---|---|
| 5,931,425 A | 8/1999 | Oliva | |
| 6,484,979 B1* | 11/2002 | Medlin, Jr. | H02G 3/125 248/909 |
| 6,666,419 B1* | 12/2003 | Vrame | H02G 3/125 248/200.1 |
| 7,036,782 B2 | 5/2006 | Cheatham et al. | |
| 7,439,443 B2 | 10/2008 | Dinh | |
| 9,397,491 B2 | 7/2016 | Birli et al. | |
| 9,444,236 B2 | 9/2016 | Witherbee | |
| 9,564,744 B2* | 2/2017 | Jaffari | H02G 3/128 |
| 9,822,926 B2 | 11/2017 | Nikayin et al. | |
| 9,825,446 B2 | 11/2017 | Korez et al. | |
| 10,084,298 B2 | 9/2018 | Ferwilleger | |
| 10,135,121 B2 | 11/2018 | Nikayin et al. | |
| 10,135,232 B2 | 11/2018 | Nikayin et al. | |
| 10,711,940 B2* | 7/2020 | Witherbee | H02G 3/125 |
| 2005/0001123 A1* | 1/2005 | Cheatham | H02G 3/125 248/298.1 |
| 2005/0067546 A1* | 3/2005 | Dinh | H02G 3/125 220/3.9 |
| 2007/0084617 A1* | 4/2007 | Dinh | H02G 3/125 174/58 |
| 2010/0000783 A1 | 1/2010 | Tally et al. | |
| 2010/0006723 A1* | 1/2010 | Yan | H02G 3/125 248/201 |

(Continued)

FOREIGN PATENT DOCUMENTS

| WO | 2010/008778 A2 | 1/2010 |
|---|---|---|
| WO | 2017/007970 A1 | 1/2017 |

*Primary Examiner* — Muhammad Ijaz
(74) *Attorney, Agent, or Firm* — Stinson LLP

(57) ABSTRACT

The present disclosure generally relates to a telescoping support bracket, a box bracket, a conduit support bracket, and a floor support bracket. The telescoping support bracket generally comprises telescoping arms that allow the length of the bracket to be adjusted. A method of installing the telescoping support bracket is also provided.

16 Claims, 24 Drawing Sheets

(56) References Cited

U.S. PATENT DOCUMENTS

| | | | |
|---|---|---|---|
| 2010/0176138 A1* | 7/2010 | Zacharevitz | H02G 1/00 |
| | | | 220/737 |
| 2014/0103180 A1* | 4/2014 | Birli | H02G 3/125 |
| | | | 248/274.1 |
| 2014/0263865 A1 | 9/2014 | Salian et al. | |
| 2016/0099555 A1 | 4/2016 | Nikayin et al. | |
| 2016/0308342 A1* | 10/2016 | Witherbee | F16B 2/245 |
| 2016/0360629 A1* | 12/2016 | Witherbee | F16M 13/02 |
| 2017/0012421 A1* | 1/2017 | Terwilleger | H02G 3/125 |
| 2018/0062365 A1* | 3/2018 | Kellerman | H02G 3/12 |
| 2019/0376643 A1* | 12/2019 | Witherbee | H02G 3/10 |
| 2020/0378553 A1* | 12/2020 | Oh | H02G 3/08 |

* cited by examiner

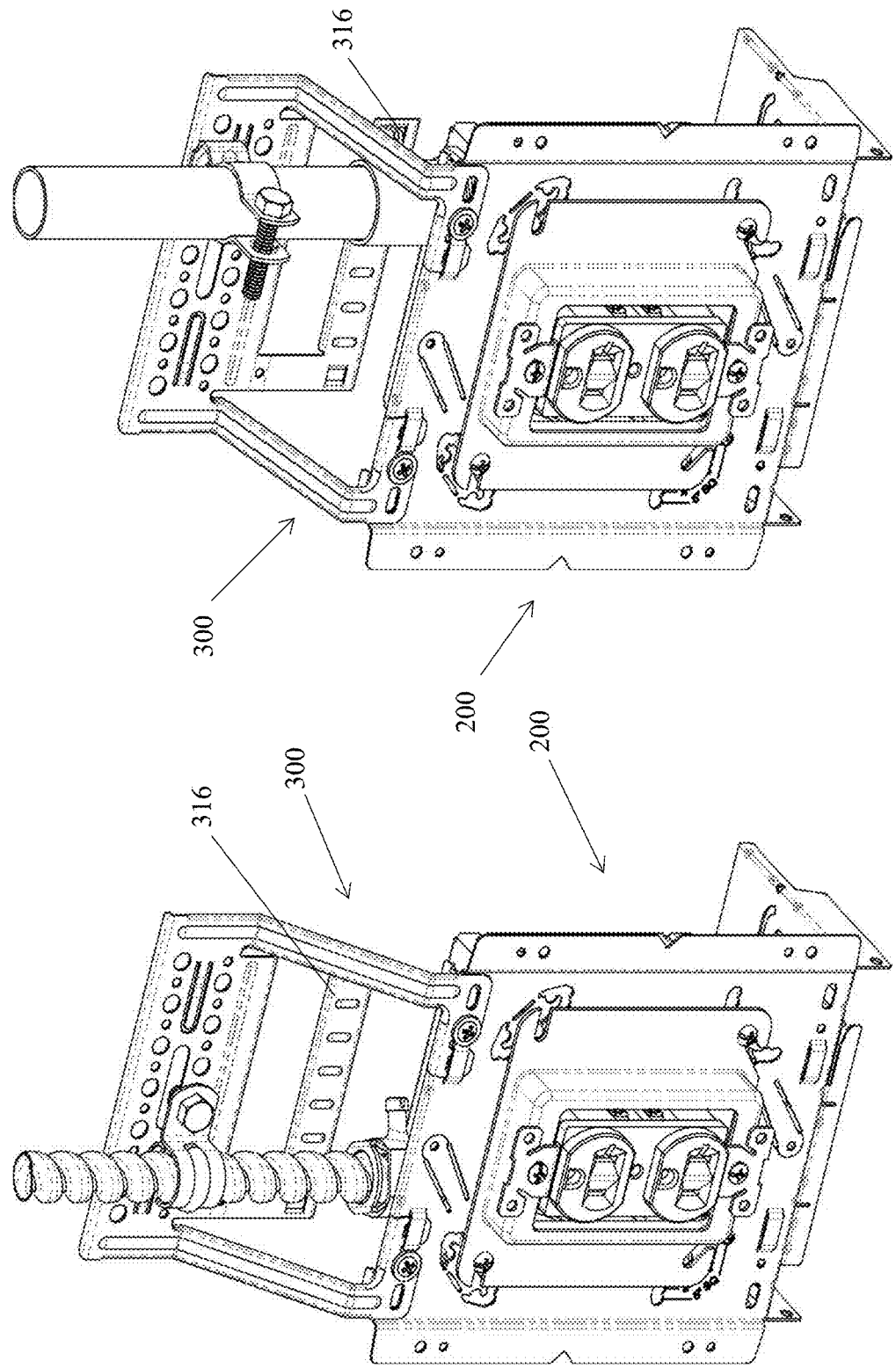

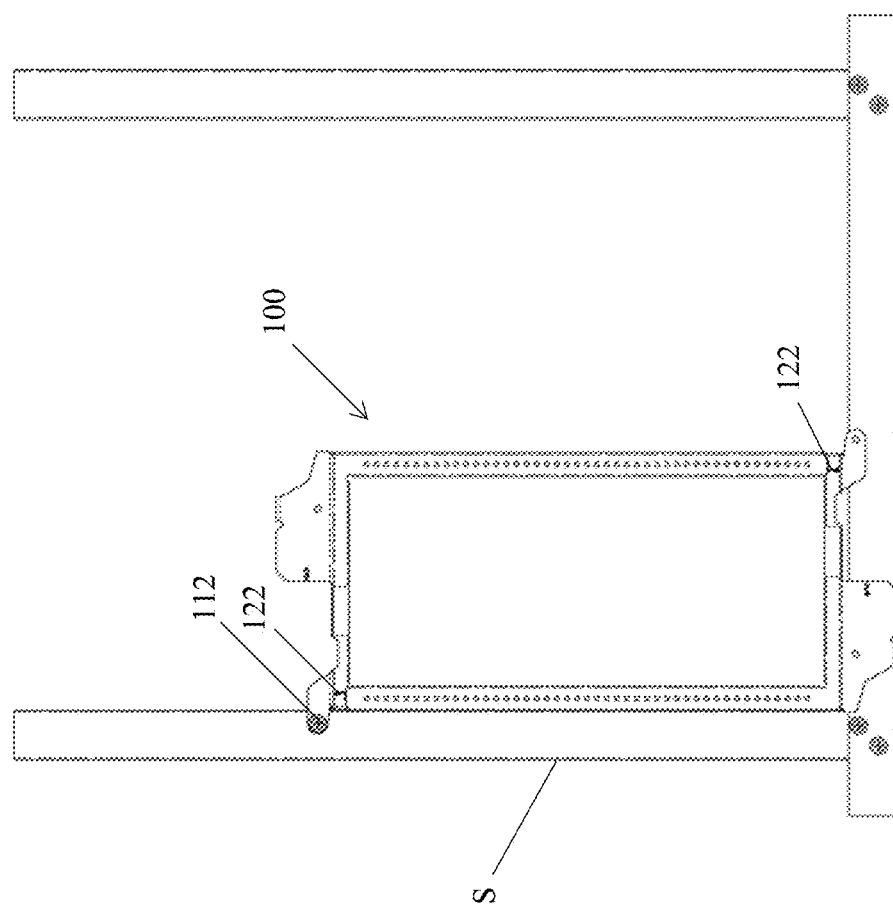

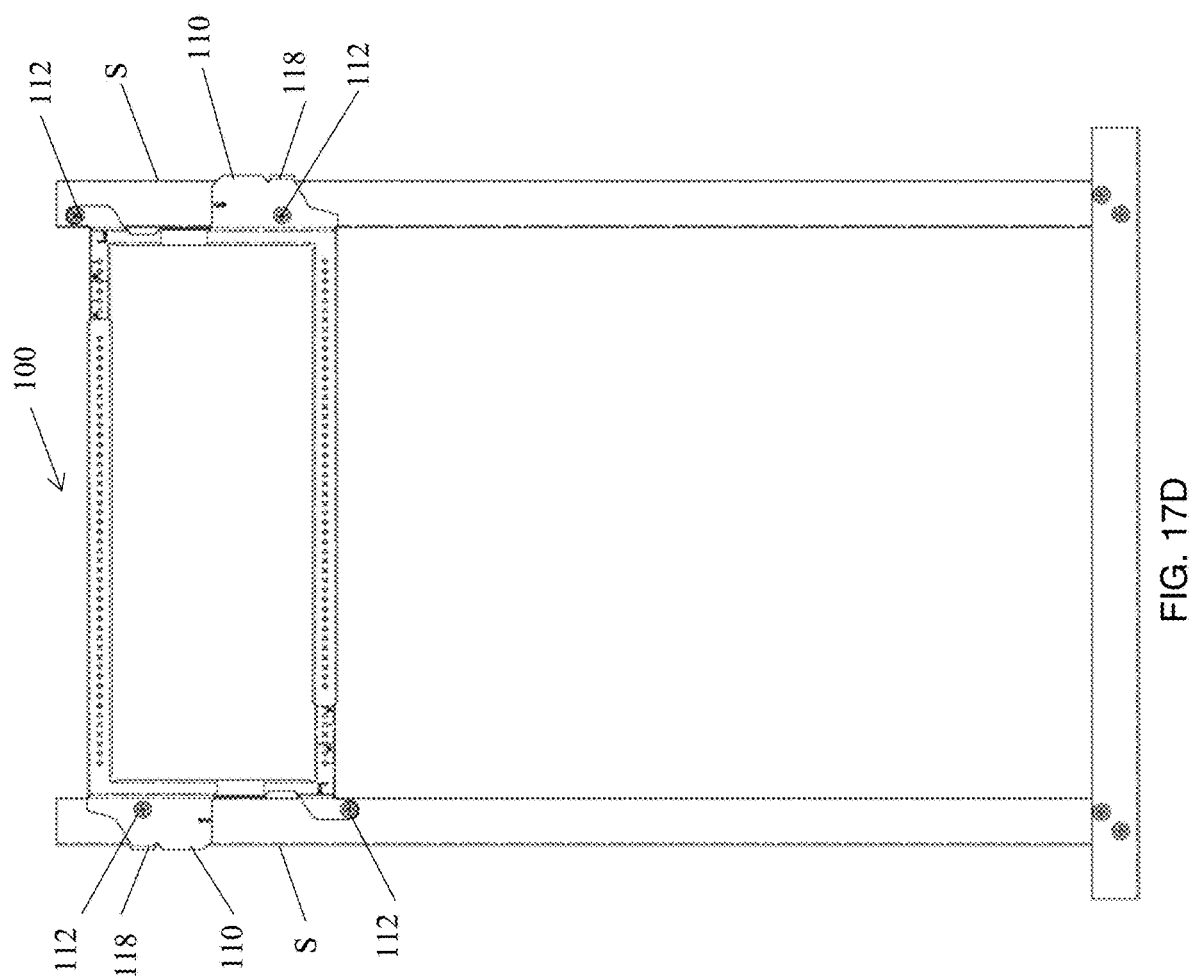

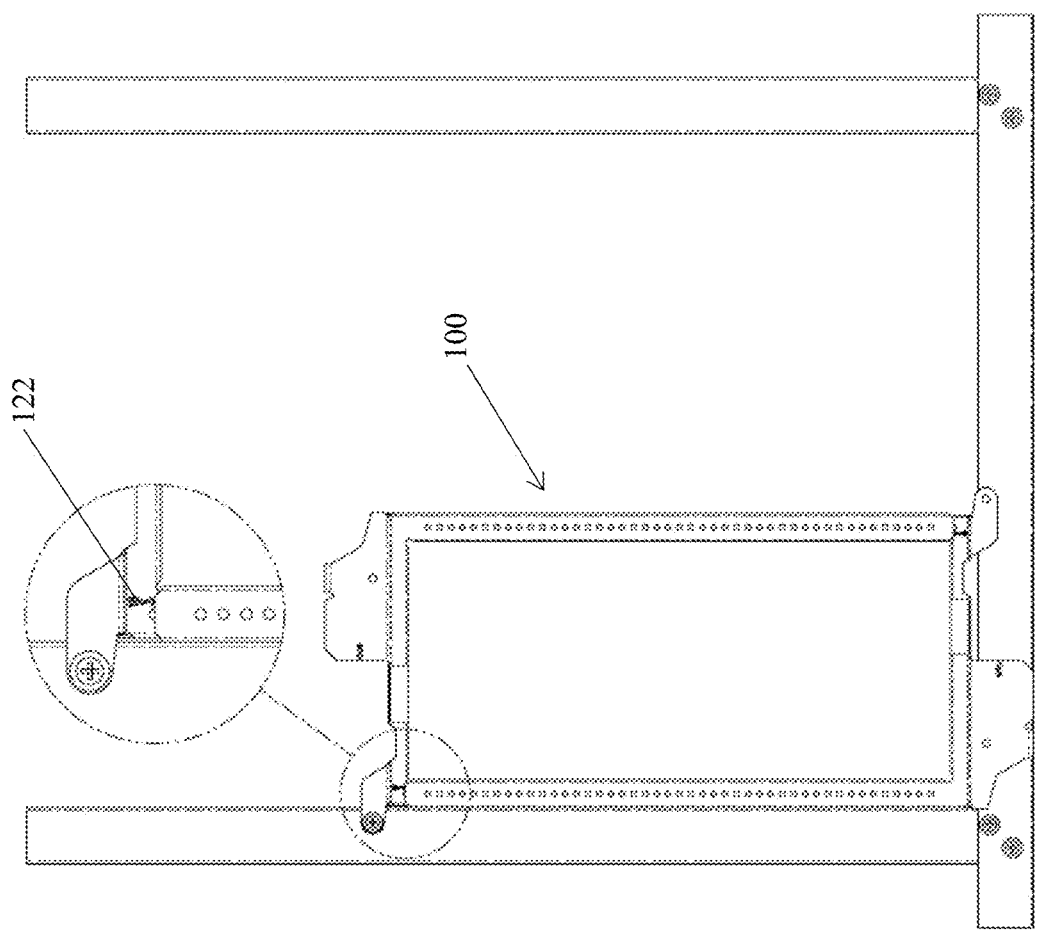

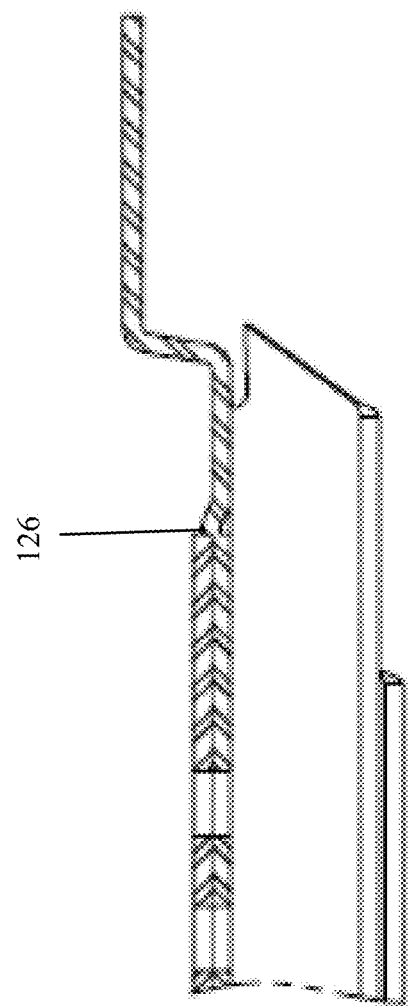

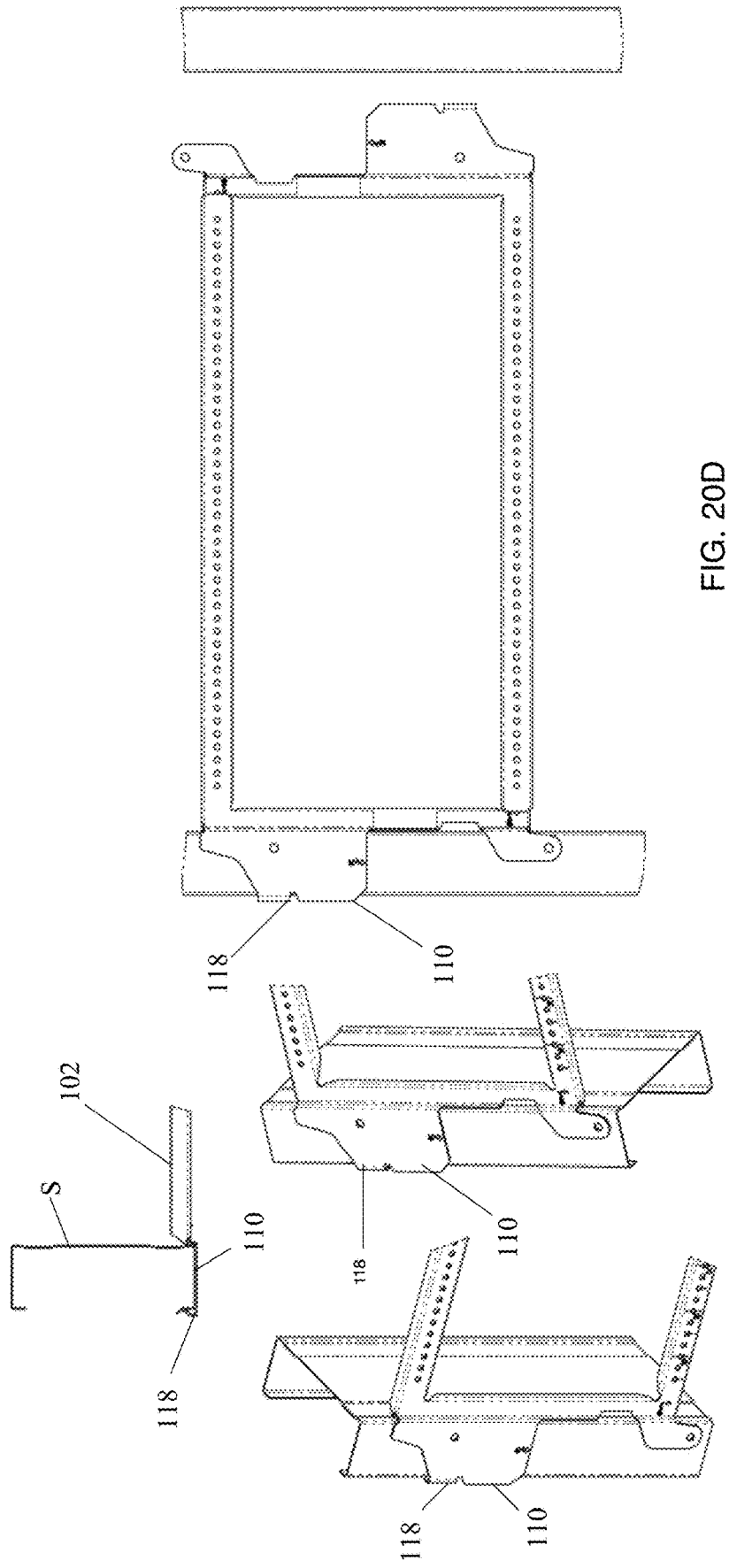

TELESCOPING BOX SUPPORT

REFERENCE TO RELATED APPLICATIONS

This application claims the benefit of U.S. Provisional Application No. 62/872,996, filed Jul. 11, 2011.

FIELD OF THE DISCLOSURE

The present disclosure generally relates to a telescoping support bracket, a box bracket, a conduit support bracket, and a floor support bracket.

BACKGROUND OF THE DISCLOSURE

The present disclosure relates to support brackets, and particular to support brackets for supporting electrical boxes and related devices. Typically, an electrical or communication device is installed in a building using a mounting bracket. The electrical or communication device is connected to the mounting bracket, and in turn, the mounting bracket is fastened to framing (e.g., wall stud) of the building. In some circumstances, junction boxes are used to house and protect electrical and communication devices, such as electrical outlets, electrical switches, associated electrical wiring, communication terminals (e.g., terminals for fiber optics), and associate communication cables (e.g., optical fiber cables). The junction box is secured to the mounting bracket, so that, in turn, the electrical or communication device is secured to the mounting bracket.

There is a need in the art for support brackets that allow attachment of devices at various locations, that attach easily to wall studs, control spacing from the floor, and are easy to assemble and low cost. The present invention seeks to address these needs.

BRIEF DESCRIPTION THE DRAWINGS

FIGS. 10A to 10D are perspective views of conduit support brackets attached to box brackets, with a variety of placements and clamping styles of the conduit on the bracket.

FIGS. 16A to 16D are front views of the telescoping support bracket being installed using the pivoting feature.

FIGS. 17A to 17D are front views of the telescoping support bracket being installed using the pivoting feature at an increased height.

FIG. 18 is a front view of the telescoping support bracket showing the height indicia.

FIG. 19B is a cross-section taken through the bracket of FIG. 19A and showing the stop.

FIG. 20A is a top view, FIGS. 20B and 20C are perspective views, and FIG. 20D is a front view, each of which show the auto-level feature of the telescoping support bracket.

Corresponding reference characters indicate corresponding parts throughout the drawings.

DETAILED DESCRIPTION

Overall, the support brackets described herein are used to attach mounting brackets to a junction box to a stud of a wall. Each support bracket is configured to be able to support box brackets of various sizes and various orientations. Each support bracket is also able to be temporarily attached to the stud without the use of fasteners. In this manner, an operator, such as a construction worker, does not have to hold the support bracket in place on the stud before securing the support bracket thereon and can, therefore, permanently secure the support bracket to the stud without both hands and/or without the use of additional tools to hold the support bracket in place.

Figure 1:
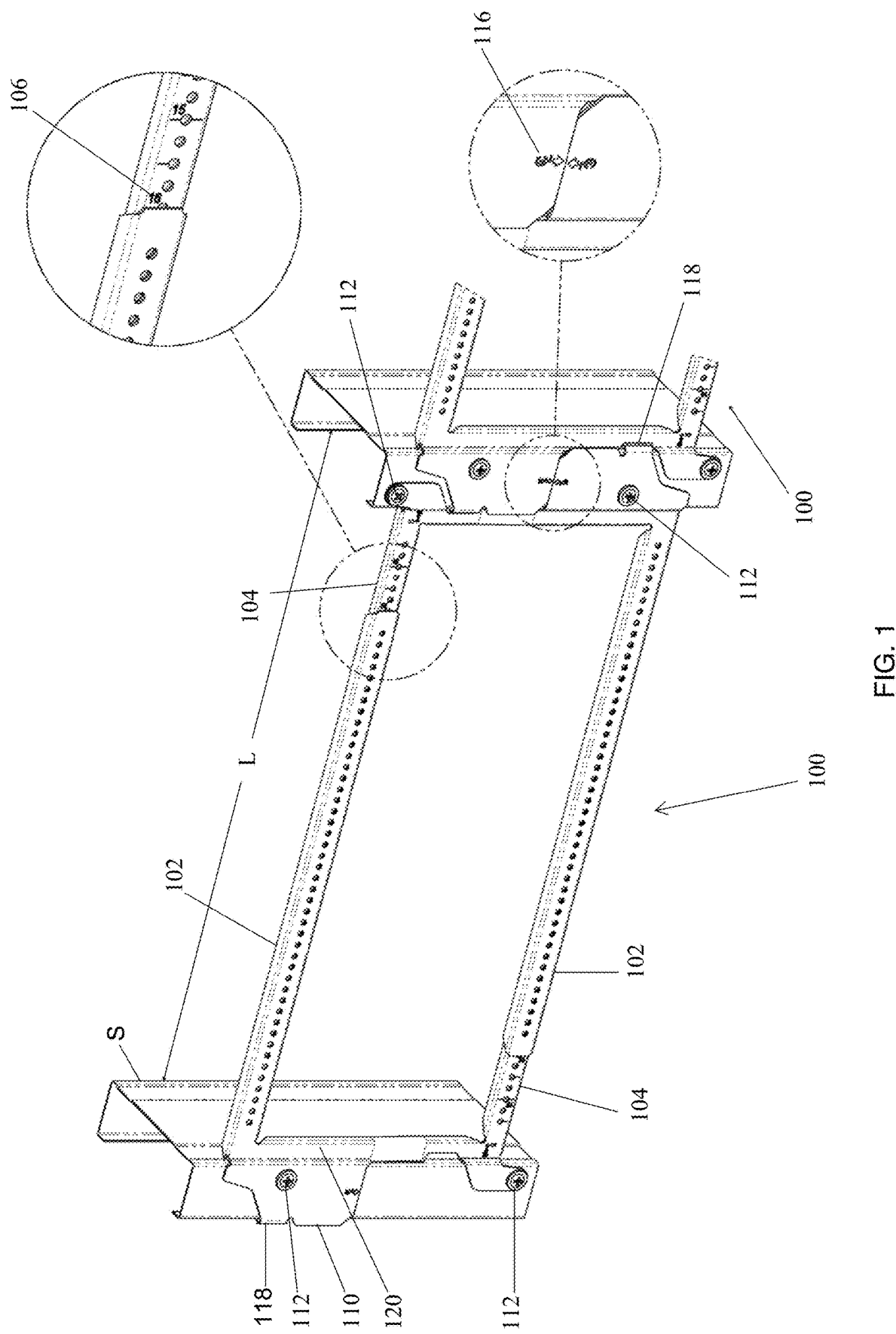
FIG. 1 is a perspective view of a telescoping support bracket of the present invention.

Referring to FIG. 1, a telescoping support bracket is generally indicated at reference numeral 100. The support bracket 100 generally has an adjustable length L. The support bracket 100 generally includes nested first and second telescoping members 102, 104, respectively. The length L of the bracket 100 can be adjusted by relative movement of the two telescoping members 102, 104. Specifically, by sliding the telescoping members 102, 104 inwardly, the length L decreases. Conversely, by sliding the telescoping members 102, 104 outwardly, the length L increases. Thus, the bracket 100 can be fashioned to fit a variety of distances between adjacent studs S. The telescoping members 102, 104 have indicia 106 printed, etched or otherwise provided thereon in order to indicate the particular length L of bracket 100 at a given configuration. Each telescoping member 102, 104 includes upper and lower legs and a stud-connecting arm 110 connected to the legs. In the illustrated embodiment, the members 102, 104 are identical and are mated with one another such that, for example, the upper leg of first telescoping member is positioned in front of the upper leg of the second telescoping member and the lower leg of the first telescoping member is positioned behind the lower leg of the second telescoping member. Positioned on either side (e.g., top and bottom) of a stud-connecting arm 110 are mounting holes 112.

In one embodiment, each of the stud-connecting arms 110 has a body (e.g., the top portion in FIG. 1) that spans the width of the stud to which is it connected. The opposite portion of stud-connecting arm 110 (e.g., the bottom portion in FIG. 1) does not protrude across the stud except for a tab defining a mounting hole 112. Therefore, once flipped and combined, bracket 100 can be used side-by-side with another bracket 100 without interference of mounting holes 112 with the mounting holes of a subsequent bracket. In various embodiments, in order to assist the user with installation of bracket 100, stud-connecting arm 110 can have the center line 116 marked.

The body of stud-connecting arm 110 can also contain a clamping flange 118 configured to engage the stud of the wall. Each clamping flange 118 is resiliently deflectable and is configured to apply force to the stud to hold the bracket 100 on the stud when the bracket 100 is mounted on the stud. The inner portion of stud-connecting arm 110 can contain flange 120 that projects rearward to add, for example, stiffness and stability to the bracket 100.

Figure 16B:
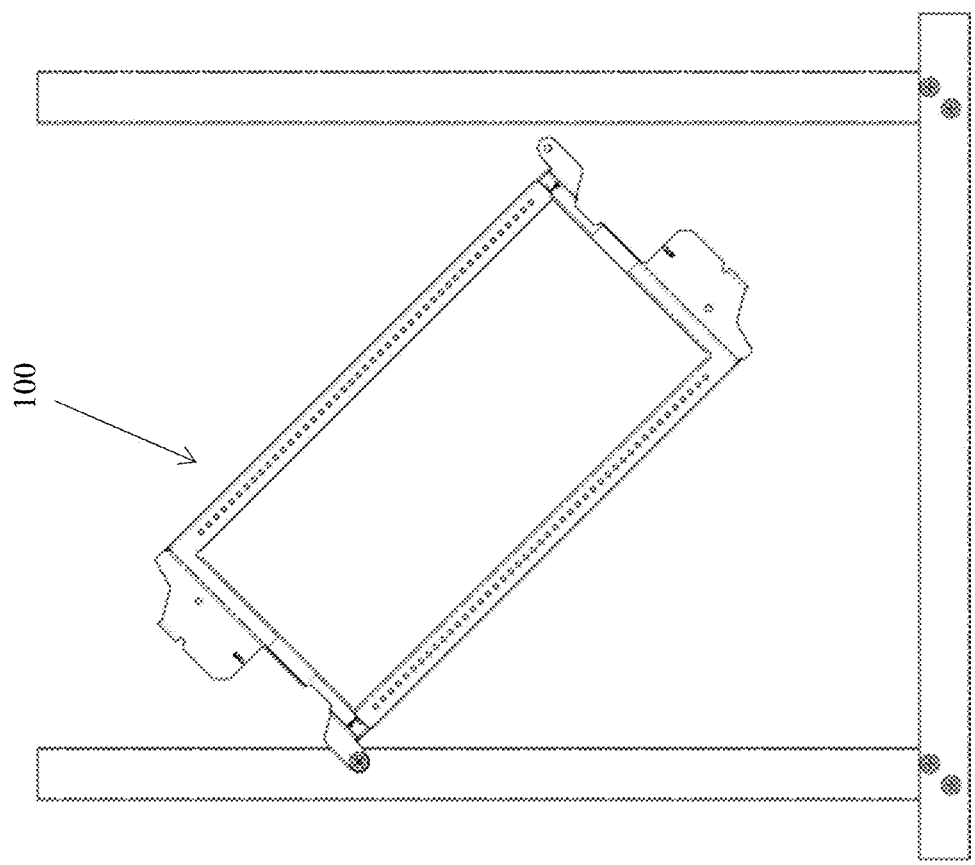
Figure 16C:
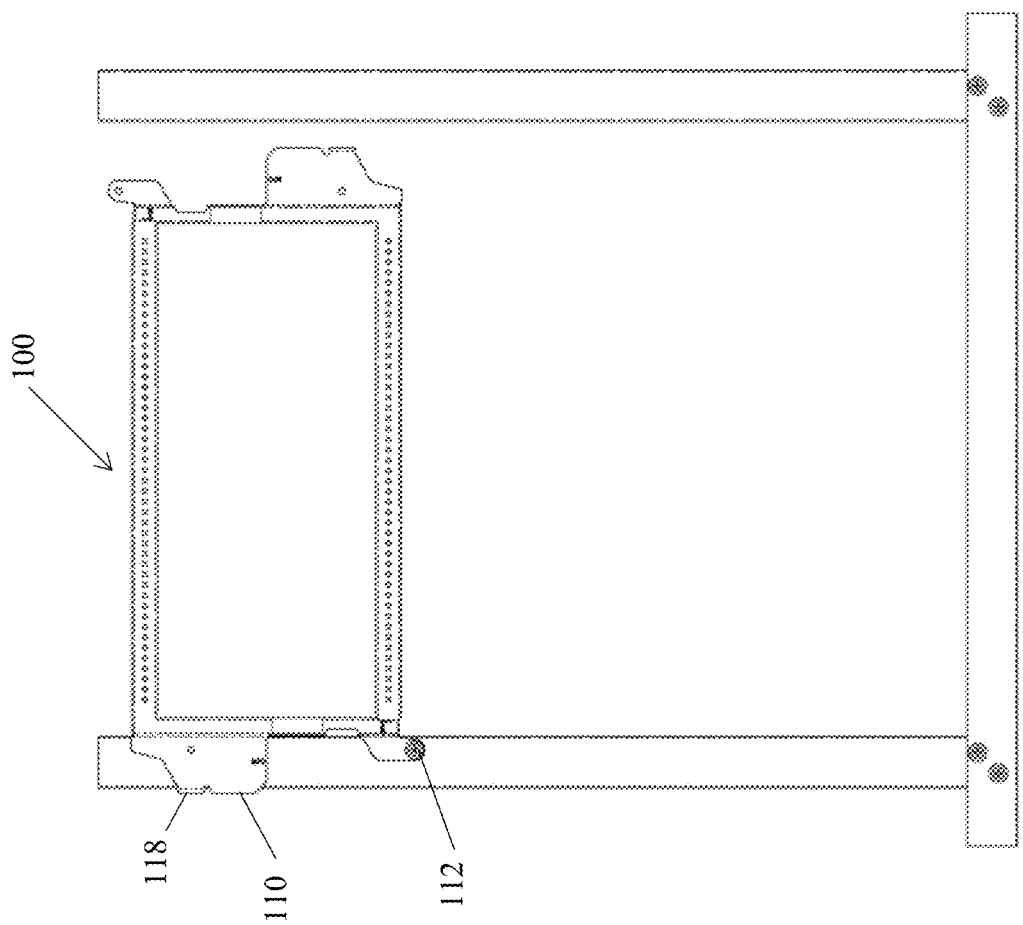
Figure 16D:
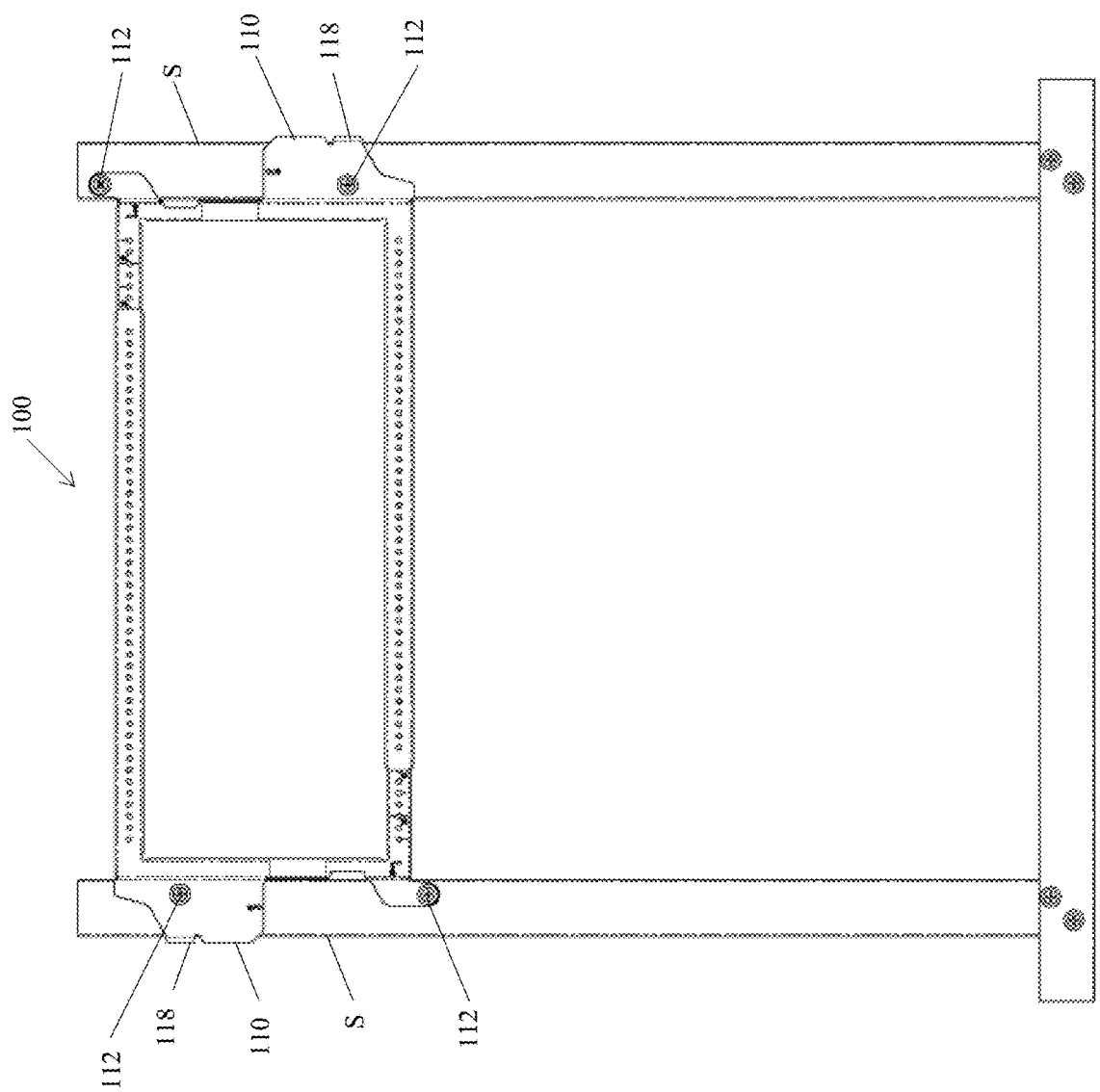
Figure 17A:
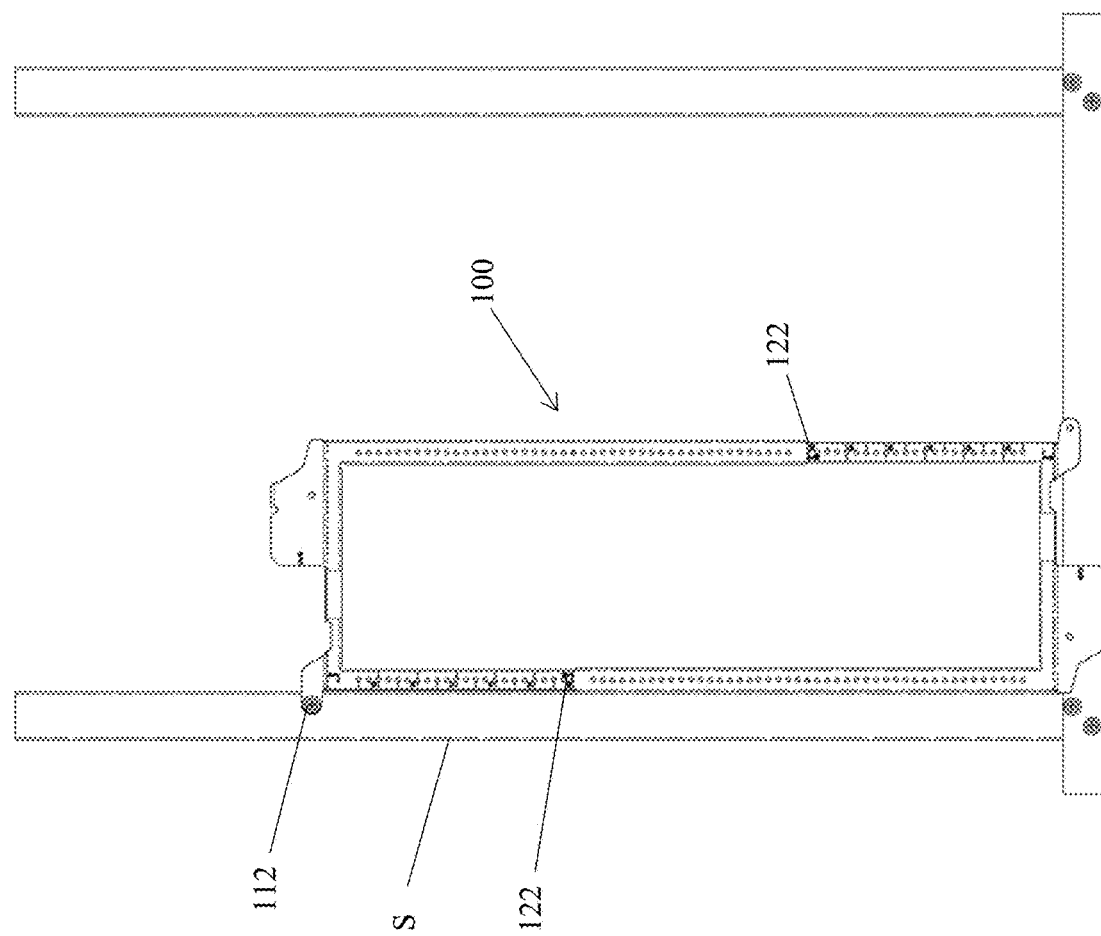
Figure 17B:
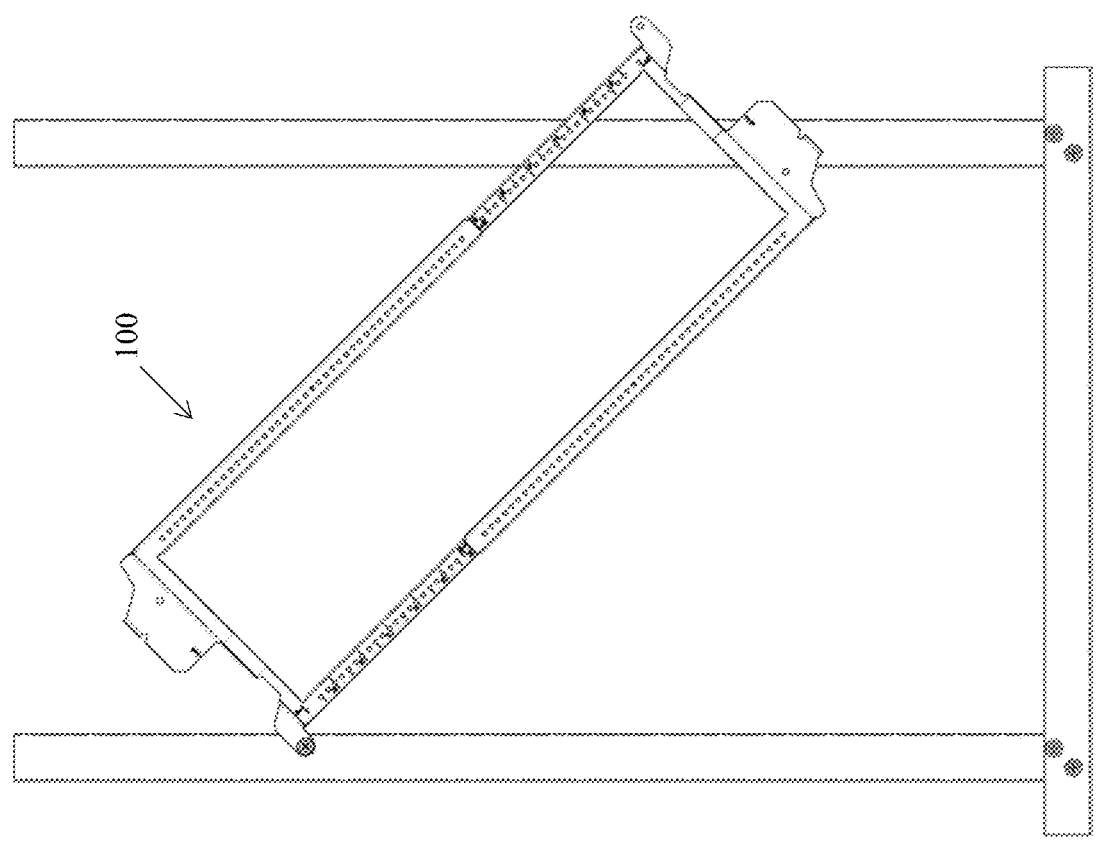
Figure 17C:
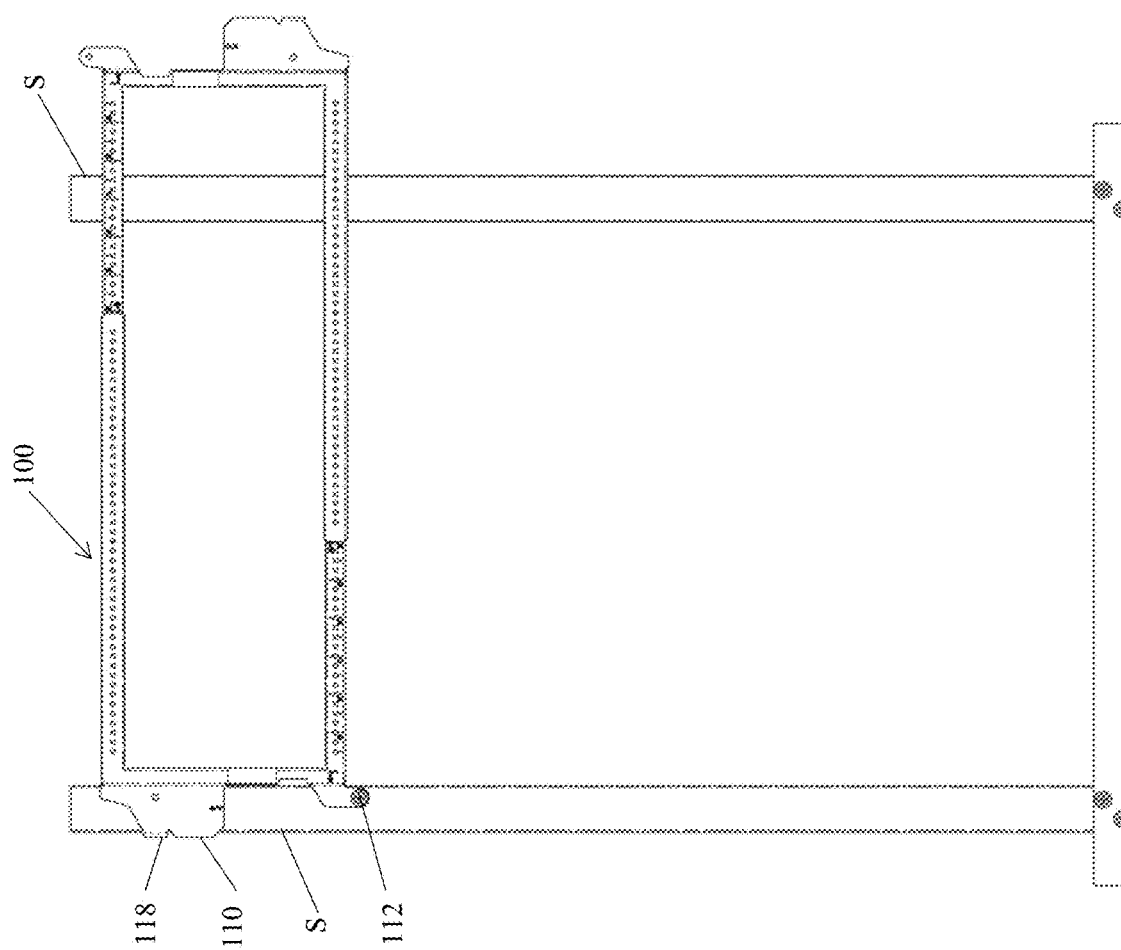
Figure 19A:
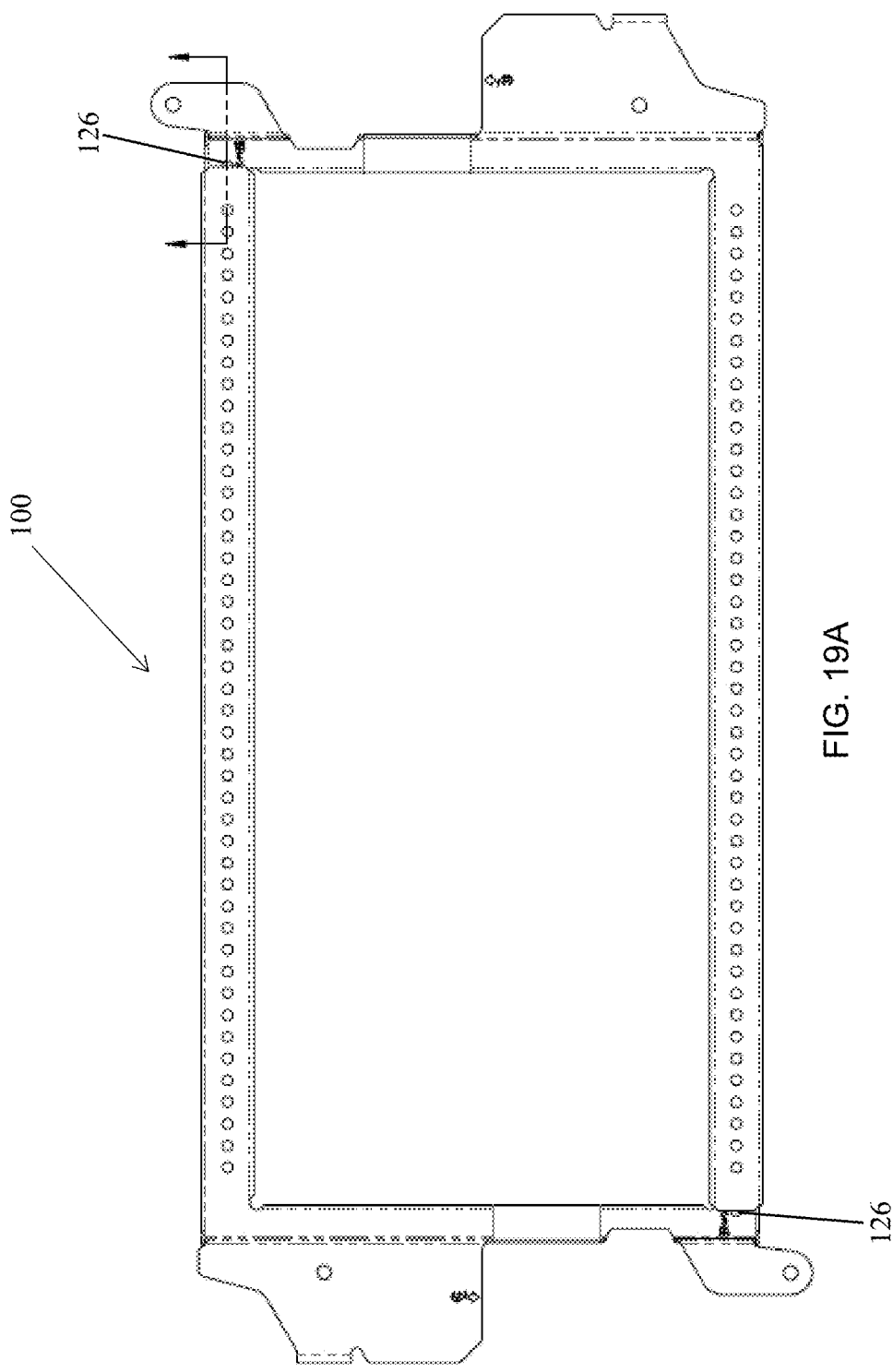
FIG. 19A is a front view of the telescoping support bracket.

In various embodiments, the length L of bracket 100 can be used during installation of the bracket 100 in order to assist a user in installing bracket 100 at an appropriate height on stud S. As best depicted in FIG. 18, telescoping arm 104 can contain indicia 122 that indicate a particular height at which the bracket 100 will be installed when the right-most stud-connecting arm 110 is placed over a sill. It will be understood that any reference to top, bottom, right, left, or any other term referencing the relative location of components and structures are described in relation to the orientation of the bracket as installed in a stud-to-stud configuration. As shown in FIGS. 19A and 19B, telescoping arms 102, 104 can contain a stop 126 (e.g., two stops; stop lances) that inhibits further collapsing of the bracket 100 beyond its smallest length (e.g., 18 in). The bracket 100 is placed generally parallel to stud S, with the right-most stud-connecting arm 110 placed over the sill. A fastener is placed in left-most tab defining mounting hole 112 (see FIGS. 16A and 17A). The right end of bracket 100 is then pivoted upwards (see FIGS. 16B and 17B). Once bracket 100 is generally perpendicular to stud S, the left-most clamping flange 118 can be engaged in order to assist in retaining bracket 100 in this position. As shown in FIGS. 20A to 20D, the engagement of clamping flange 118 and stud-connecting arm 110 on stud S assist in installing bracket 100 in a generally level position, that is, generally perpendicular to stud S. The length L of bracket 100 can then be adjusted as necessary by sliding telescoping arms 102, 104. As shown in FIG. 16C, the length L of bracket 100 may need to be increased, in which case, telescoping arms 102, 104 would be slid apart. As shown in FIG. 17C, the length L of bracket 100 may need to be decreased, in which case, telescoping arms 102, 104 would be slid together. Once the appropriate length L is achieved, the right-most clamping flange 118 can be engaged in order to further assist in retaining bracket 100 in this position. The remaining fasteners can then be installed in mounting holes 112 (see FIGS. 16D and 17D).

Figure 2:
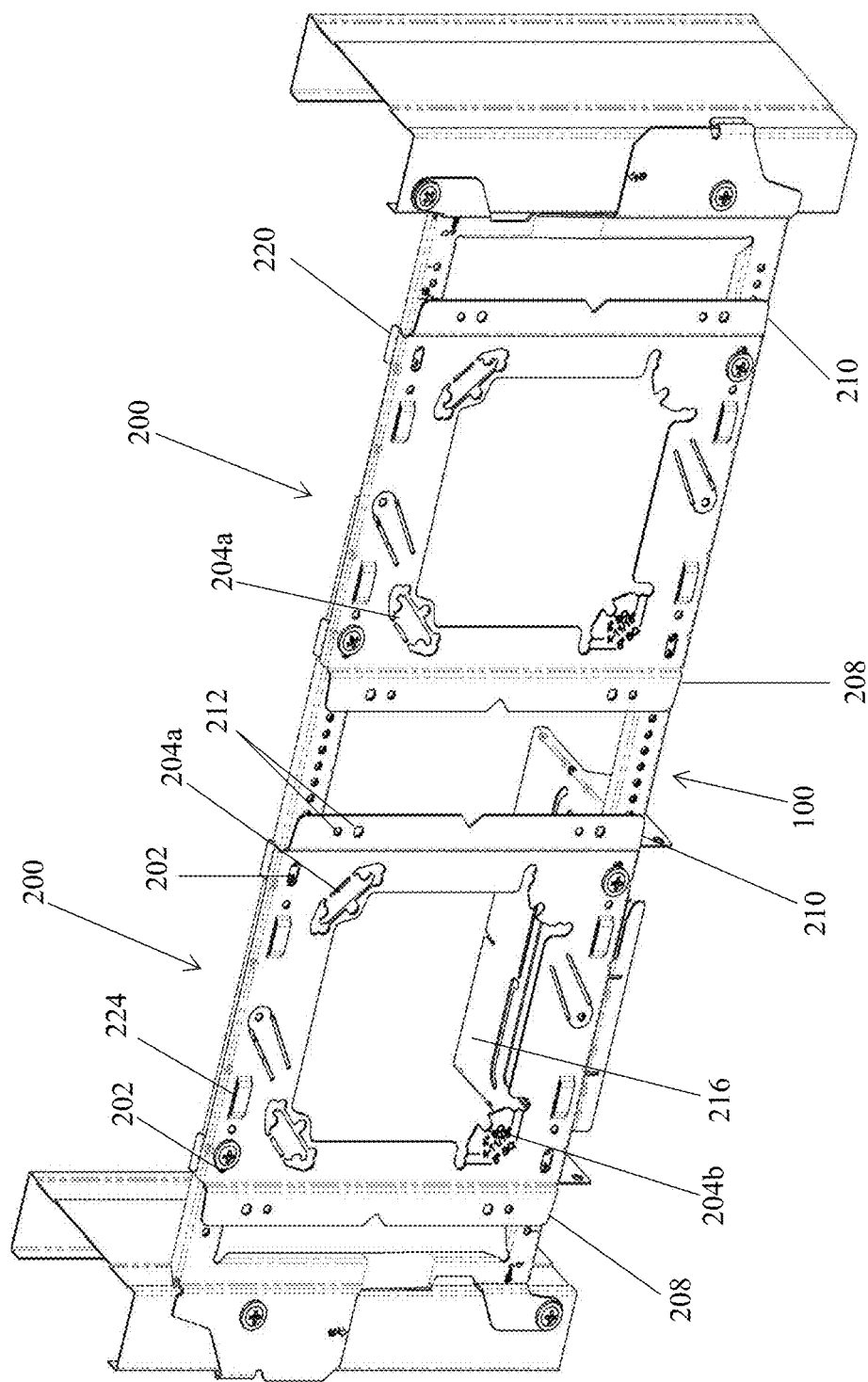
FIG. 2 is a perspective view of box brackets attached to the telescoping support bracket.
Figure 4:
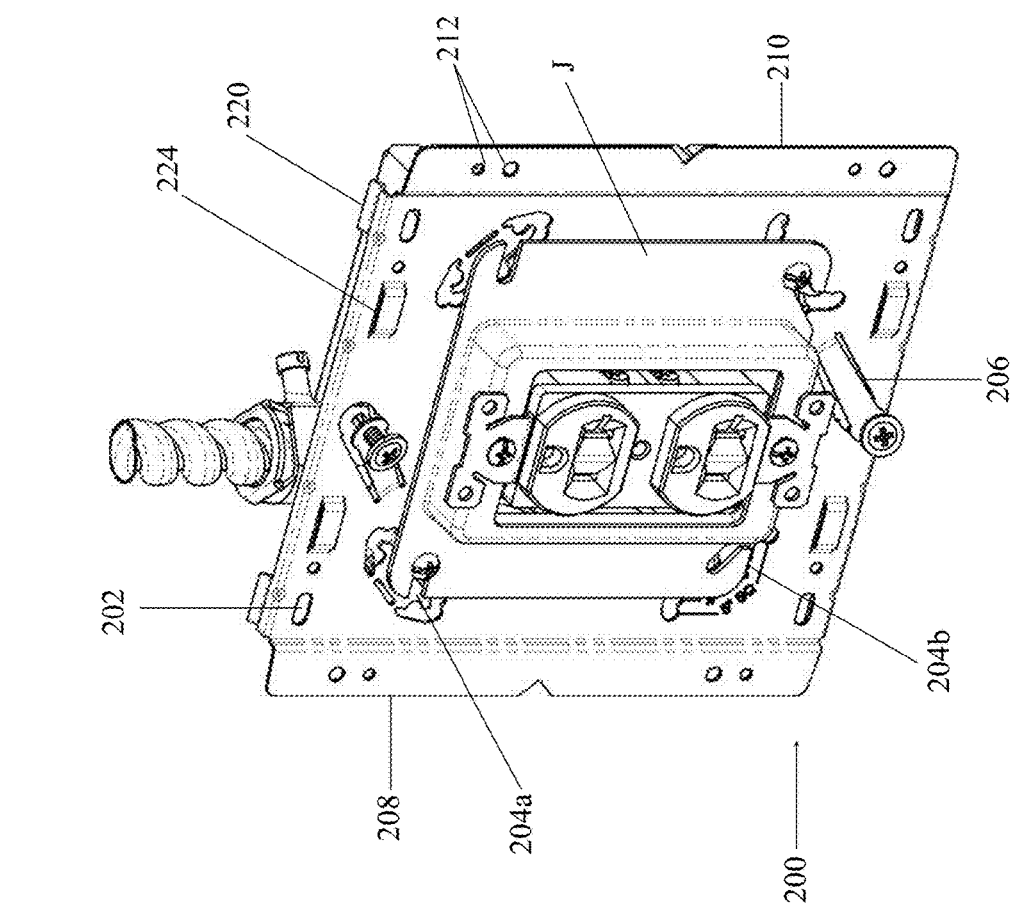
FIG. 4 is a perspective view of a box bracket with a junction box connected thereto.

Each of telescoping members 102, 104 contains a plurality of holes along the length thereof. Each of these holes allow for connection of various accessories and devices. As depicted in FIG. 2, these holes can allow for connection of a box bracket 200. Box bracket 200 contains slots 202 that allow access to the holes of bracket 100 to allow fastening of box bracket 200 thereto. Box bracket 200 can comprise a first box mounting opening type 204a and a second box mounting opening type 204b. The box bracket 200 contains two of each first and second box mounting opening type 204a, 204b. In the illustrated embodiment, the upper two box mounting opening sets are of the first box mounting opening type 204a, and the lower two box mounting opening sets are of the second box mounting opening type 204b, although other positions of the first and second box mounting opening types are within the scope of the present disclosure. The first and second mounting opening types 204a, 204b are configured to receive a fastener in a plurality of different locations to enable junction boxes J of different sizes to attach to the box bracket 200 and in different orientations (FIG. 4).

Figure 3:
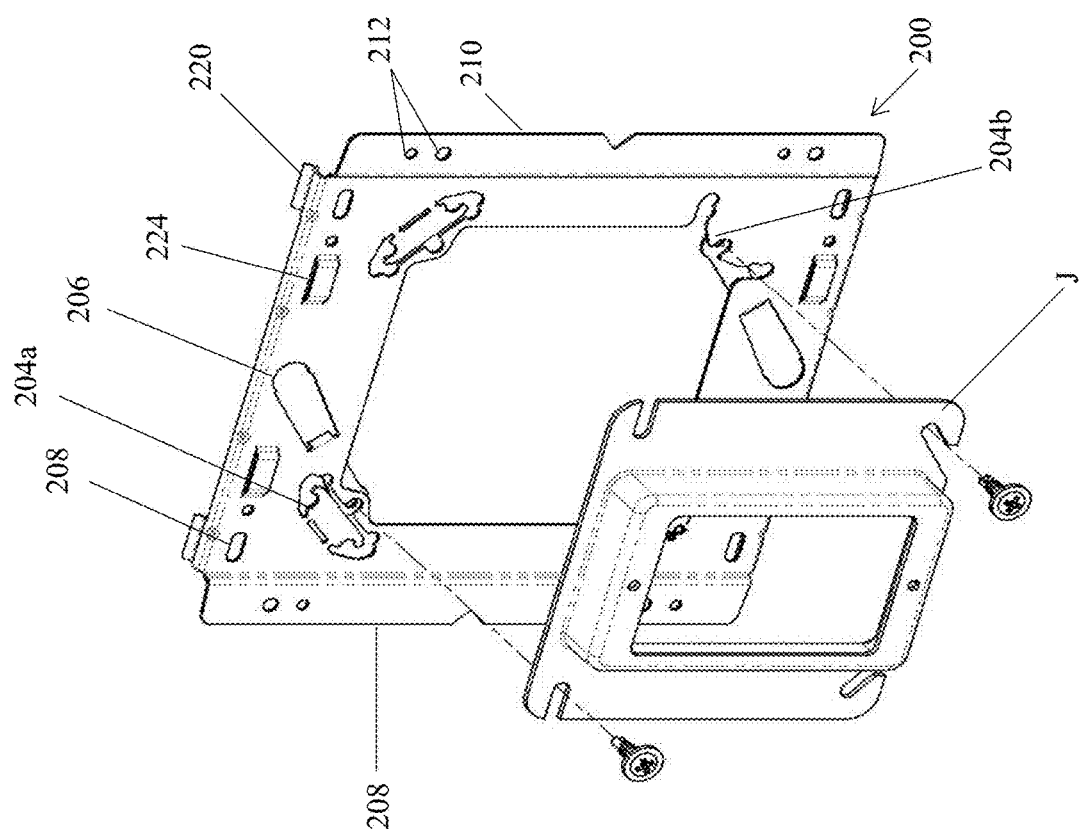
FIG. 3 is a perspective exploded view of a box bracket with a plaster ring.

Each box bracket 200 also can also include one or more plaster ring mounting tabs 206 for use in attaching a plaster ring PR (e.g., mud ring) (FIG. 3) to the box bracket 200 without using the junction box J. Further details of plaster ring mounting tabs 206 and how they are used to attach a plaster ring PR may be found in U.S. Pat. No. 9,444,236. The plaster ring mounting tab 206 can also contain a fastener opening therein. Therefore, box bracket 200 can be suitable for pre-fabrication systems. A fastener can be inserted into the fastener opening in plaster ring mounting tab 206 and can be used to secure mounting box 200 to support bracket 100.

Figure 5:
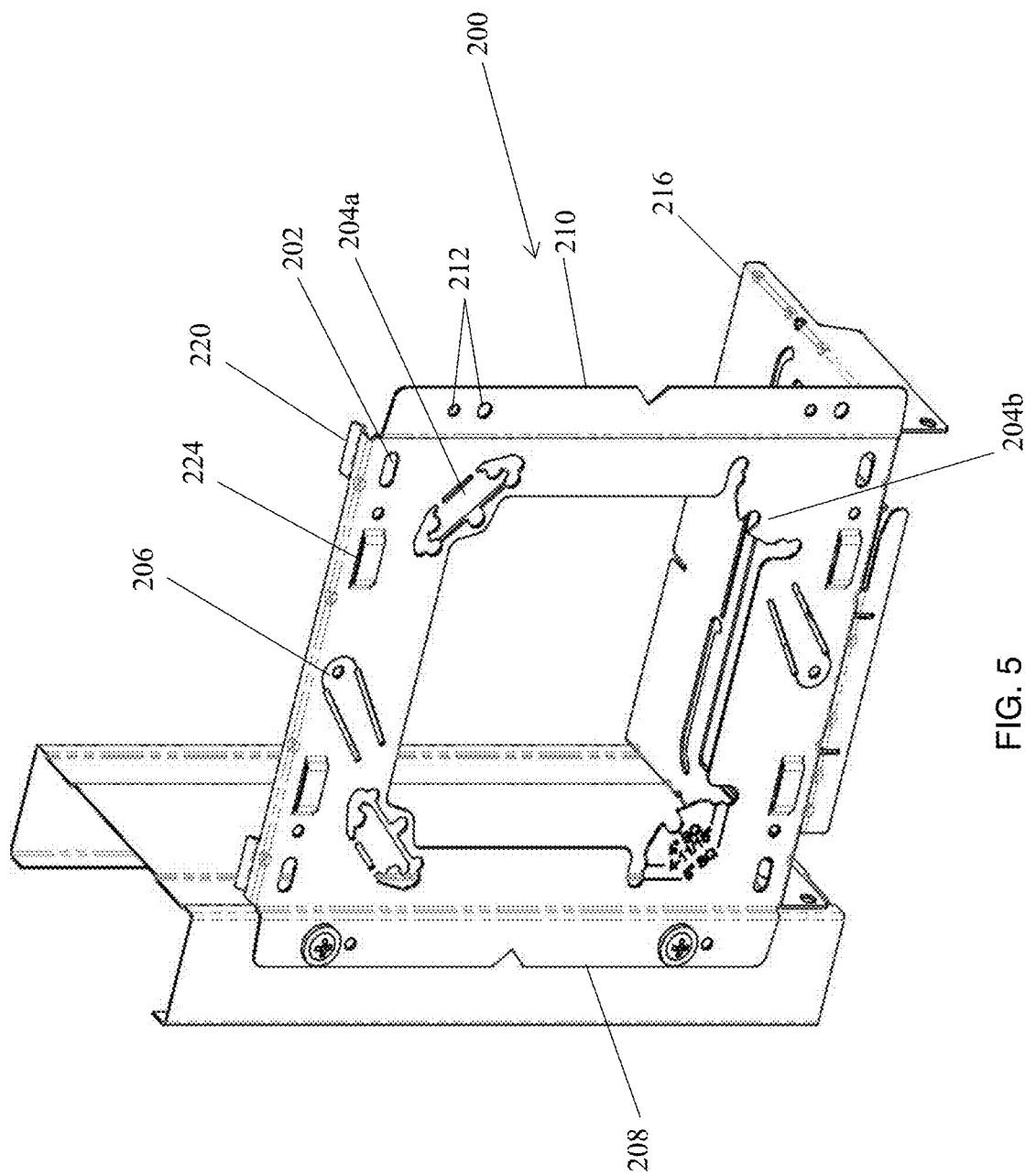
FIG. 5 is a perspective view of a box bracket coupled to a stud.
Figure 6:
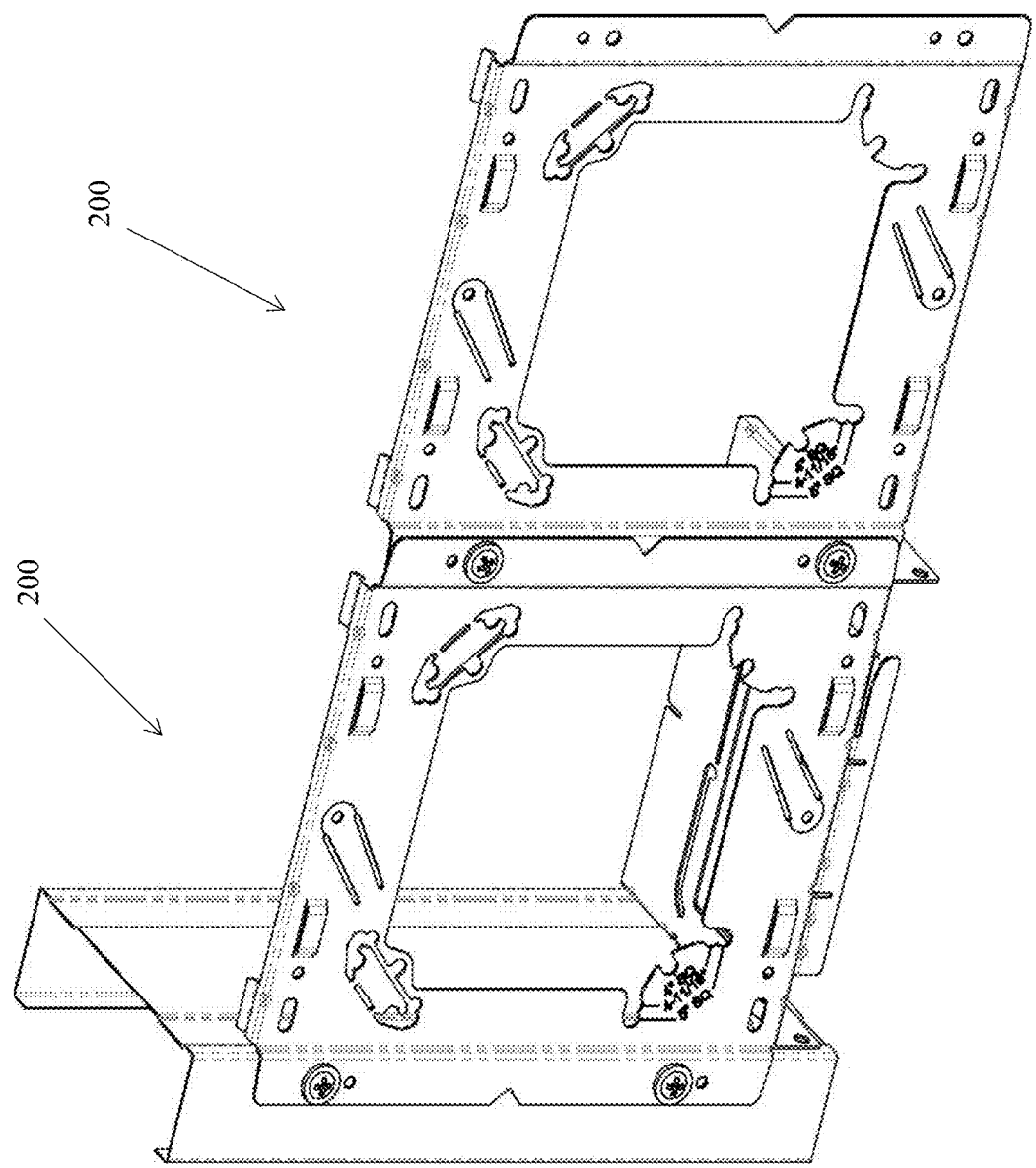
FIG. 6 is a perspective view of side-by-side box brackets coupled to a stud.

Box bracket 200 also includes a pair of left and right stud-mounting flanges 208 and 210. The left and right stud-mounting flanges 208, 210 extend laterally outward from the left and right edge margins, respectively, of the face plate. In general, these stud-mounting flanges 208, 210 are used to secure the box bracket 200 to a stud of a wall (FIG. 5). The stud-mounting flanges 208, 210 are generally planar and are configured to engage a side surface of the stud. The stud-mounting flanges 208, 210 are co-planar with one another and generally parallel to the face plate of box bracket 200. The stud-mounting flanges 208, 210 define fastener openings 212 to receive fasteners (e.g., self-tapping sheet metal screws) (FIG. 5) to secure the box bracket 200 to the stud. The fastener openings 212 are also disposed on the left and right stud-mounting flanges 208, 210 so that corresponding fastener openings 212 of two box brackets 200 arranged in an overlapping, side-by-side arrangement align with one another and can receive a fastener therein (FIG. 6).

The box bracket 200 can also include a base flange 216 extending reward from the lower edge margin of the face plate. The base flange 216 is generally perpendicular the face plate. In a preferred embodiment, the base flange 216 extends a distance from the face plate that is equal to the depth of the stud (e.g., stud wall) so that the rear-most edge margin of the base flange 216 engages the inside of the opposite face of the wall (e.g., drywall) to provide additional support for the box bracket 200 when secured to the stud or the telescoping support bracket.

The top and/or bottom of the box bracket 200 can also contain at least one clamping flange 220 configured to engage the telescoping member of the support bracket 100. Each clamping flange 220 is resiliently deflectable and is configured to apply force to the bracket 100 to hold the box bracket 200 on the bracket 100 when the box 200 is mounted on the bracket 100.

Figure 7:
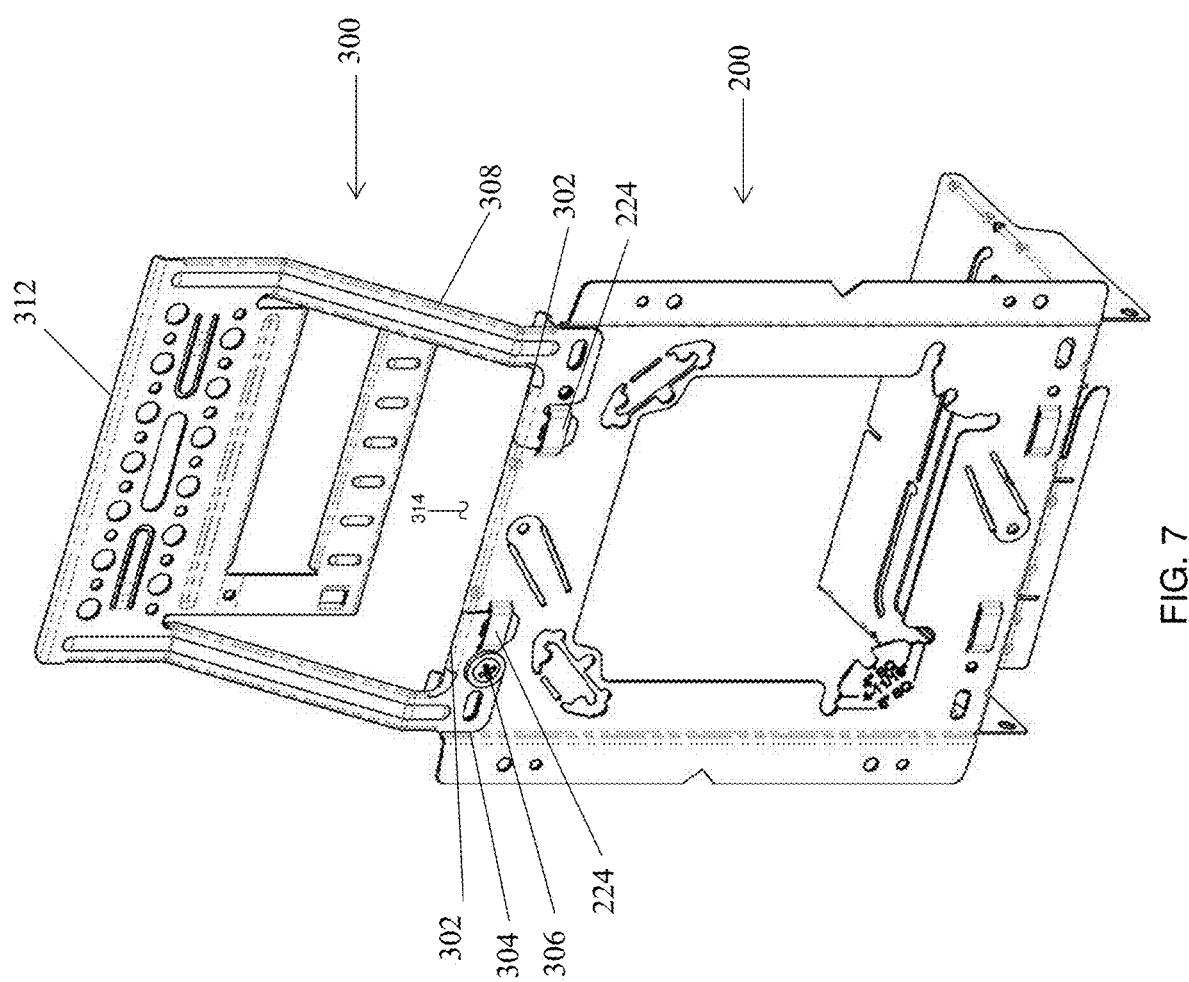
FIG. 7 is a perspective view of a box bracket coupled to a conduit support bracket.

Box bracket 200 also contains straps 224 (e.g., formed by lancing) that extend forward away from box bracket 200 to allow connection of additional accessories, such as, for example, conduit support bracket 300 (FIG. 7).

Figure 8:
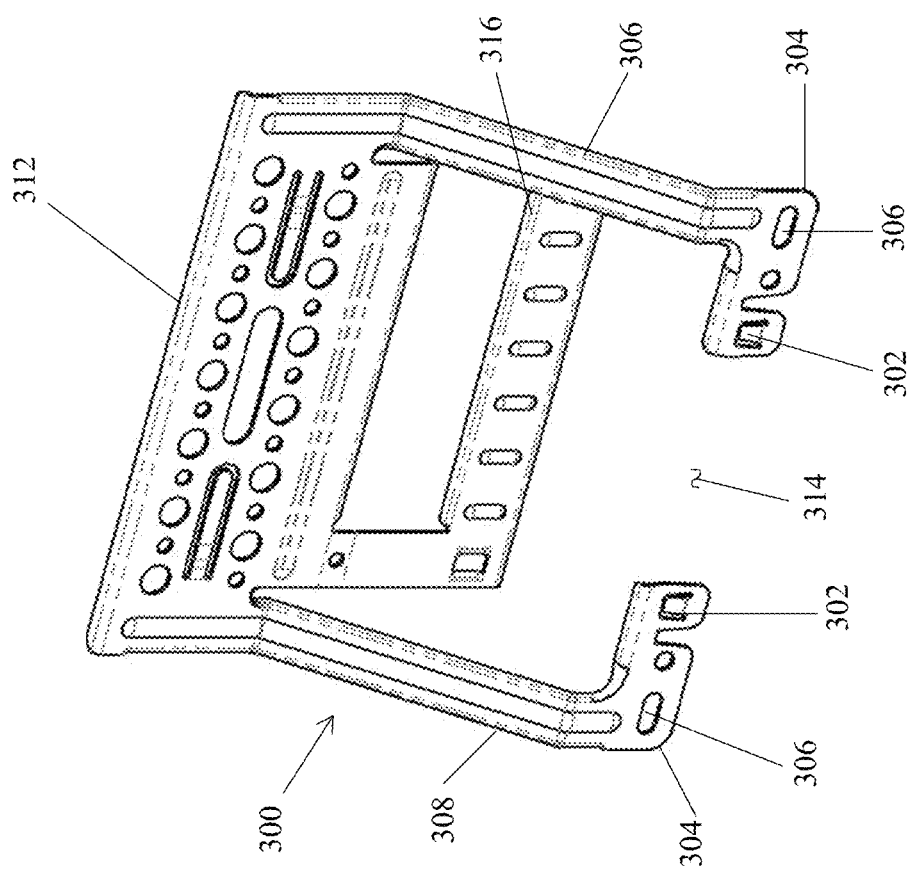
FIG. 8 is a perspective view of a conduit support bracket.

Referring now to FIGS. 7 and 8, a conduit support bracket 300 contains tabs 302 that mate with straps 224 of box bracket 200 to allow connection of the conduit support bracket 300 to the box bracket 200. Extending outward from each of tabs 302 is a connection flange 304. Connection flanges 304 contain fastener openings 306 that correspond to fastener openings 202 of box bracket 200 to allow connection of each of the conduit support bracket 300 and box bracket 200 to the support bracket 100. Connection flanges 304 can also contain rearward facing flanges 310 to provide a secondary connection point to the support bracket 100

Figure 9:
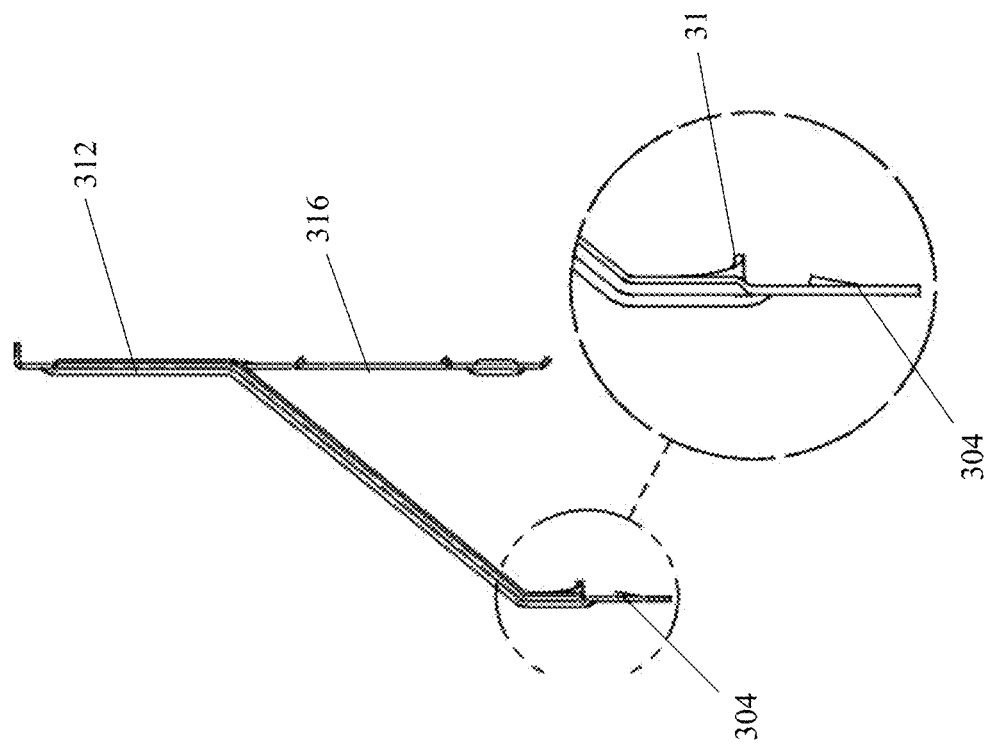
FIG. 9 is a side view of a conduit support bracket.

(FIG. 9). The rearward facing flanges 310 clamp around the telescoping members 102, 104 of the support bracket 100 to provide additional support.

Figure 10B:
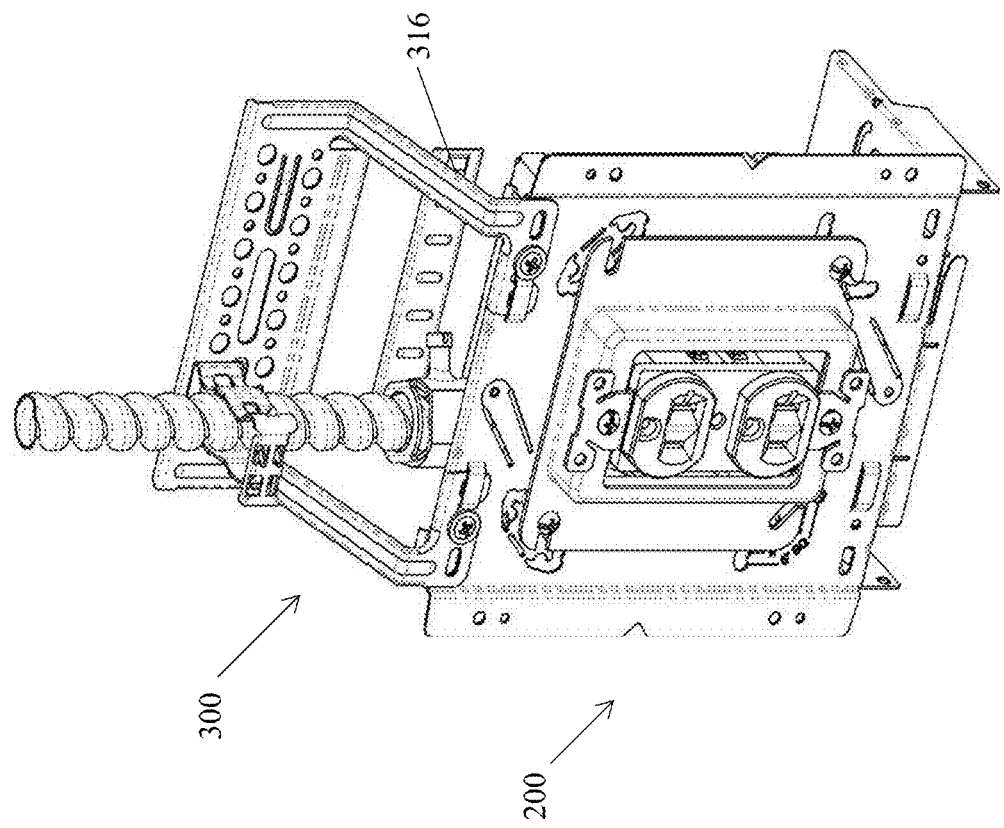
Figure 10A:
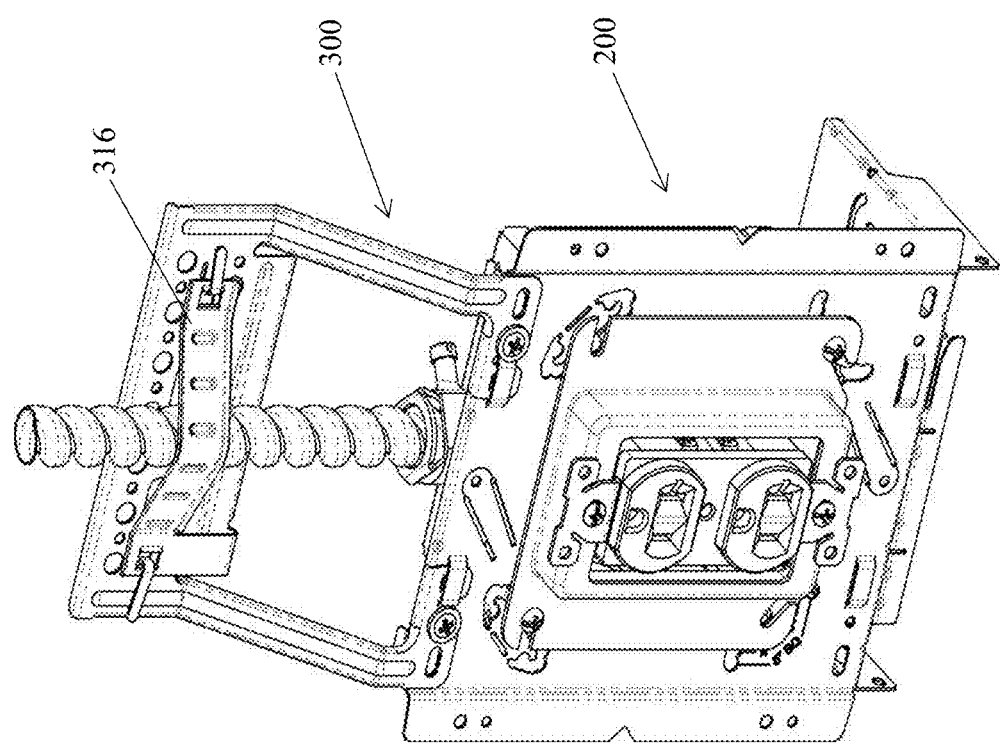

Extending upward and rearward from the connection flange 304 (e.g., at a rearward-facing angle), at an outer edge thereof, are arms 308. Arms 308 are made of a deformable material that can be manipulated by the user to allow for connection of a conduit at an appropriate location. Support flange 312 is generally parallel to connection flanges 304 and at the opposite end of arms 308. Support flange 312 contains a variety of sizes and shapes of openings to allow for many types and locations of clamps (see FIGS. 10A to 10D). As shown in FIG. 10A, the support flange 312 can include a resiliently deflectable strap 316 to capture and support the conduit between support flange 312 and strap 316. When strap 316 is not needed, it can remain in a downward and disengaged position as shown in FIGS. 10B to 10D.

Tabs 302 define a space 314 extending therebetween. Space 314 allows conduit support bracket 300 to be installed around existing conduits without the need to move or replace the conduit.

Figure 12:
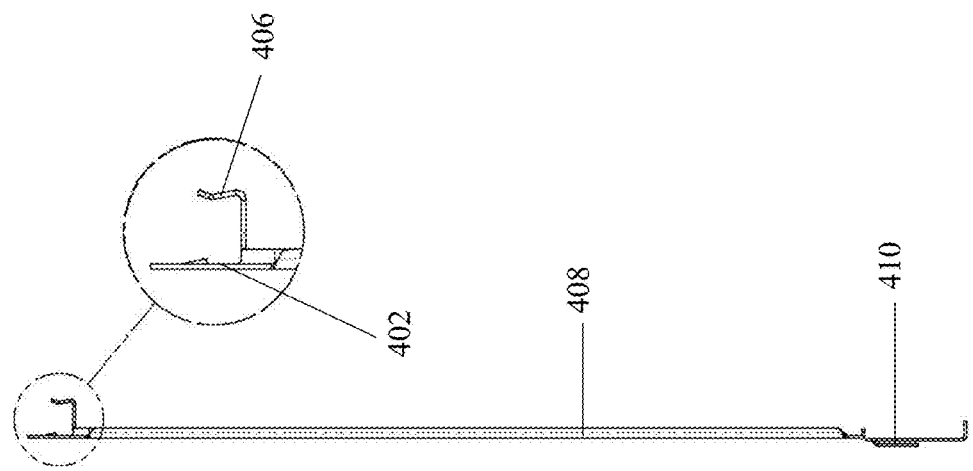
FIG. 12 is a side view of a floor support bracket.
Figure 11:
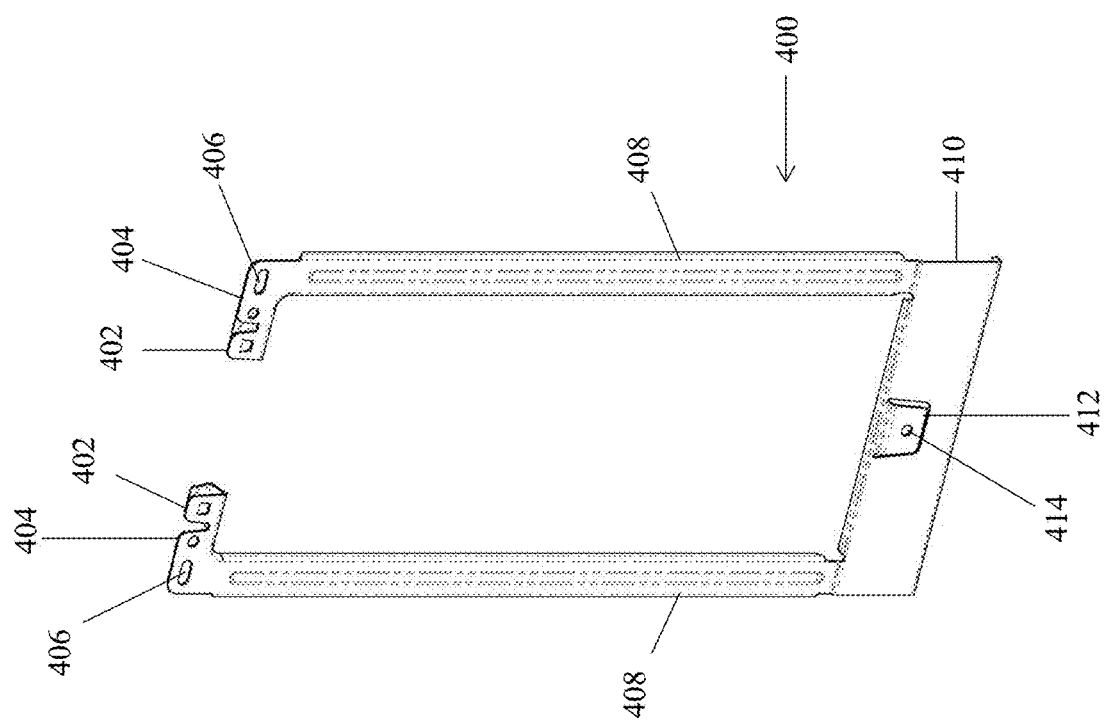
FIG. 11 is a perspective view of a floor support bracket.
Figure 13:
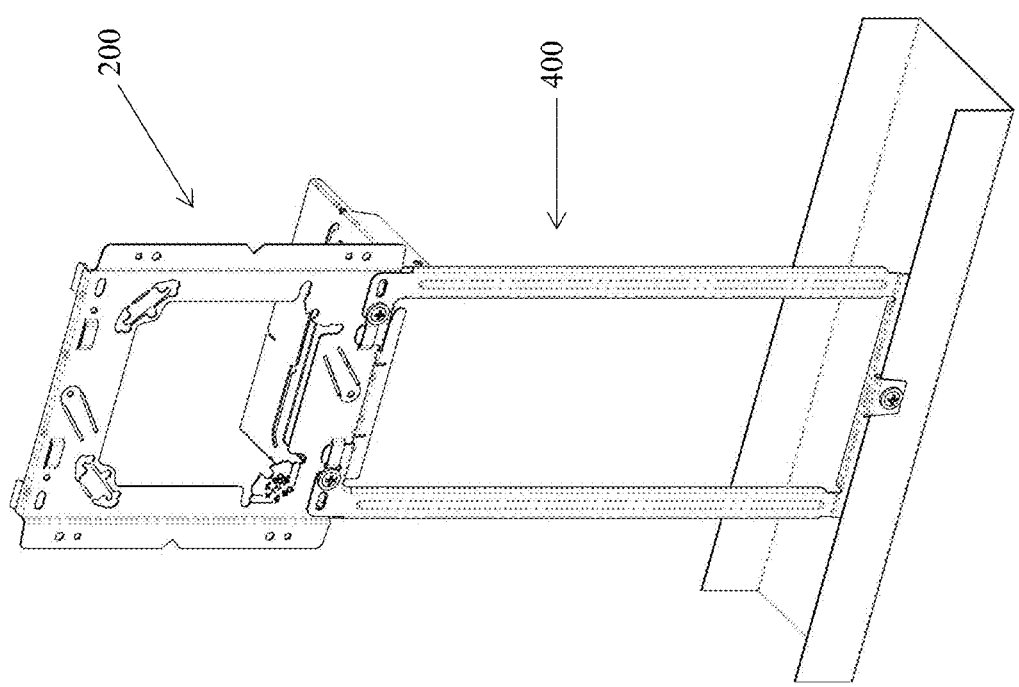
FIG. 13 is a perspective view of a floor support bracket attached to a box bracket.

Also provided herein is floor support bracket 400 (FIGS. 11 and 12). Floor support bracket 400, like conduit support bracket 300, contains tabs 402 that mate with straps 224 of box bracket 200 to allow connection of the floor support bracket 400 to box bracket 200. Floor support bracket 400 also contains connection flanges 404 that extend outward from each of tabs 402. Connection flanges 404 contain fastener openings 406 that correspond to fastener openings 202 of box bracket 200 to allow connection of each of the floor support bracket 400 and box bracket 200 to support bracket 100, if desired. Connection flanges 404 can also contain rearward facing flanges 406 to a secondary connection point to the support bracket 100 (FIG. 12). The rearward facing flanges 406 clamp around the telescoping members of the support bracket 100 to allow for additional support. Extending downward and in a planar fashion from each of connection flanges 404 are arms 408. Arms 408 culminate in the bottom flange 410 that is generally parallel to connection flange 404. Bottom flange 410 can contain a tab 412 with fastener opening 414 that allows for connection of a fastener to the sill. The tab 412 can be placed over the sill (i.e., bottom flange 410 is on one side of the sill and tab 412 is on the opposite side of the sill) and a fastener is secured to the sill (FIG. 13).

Figure 14:
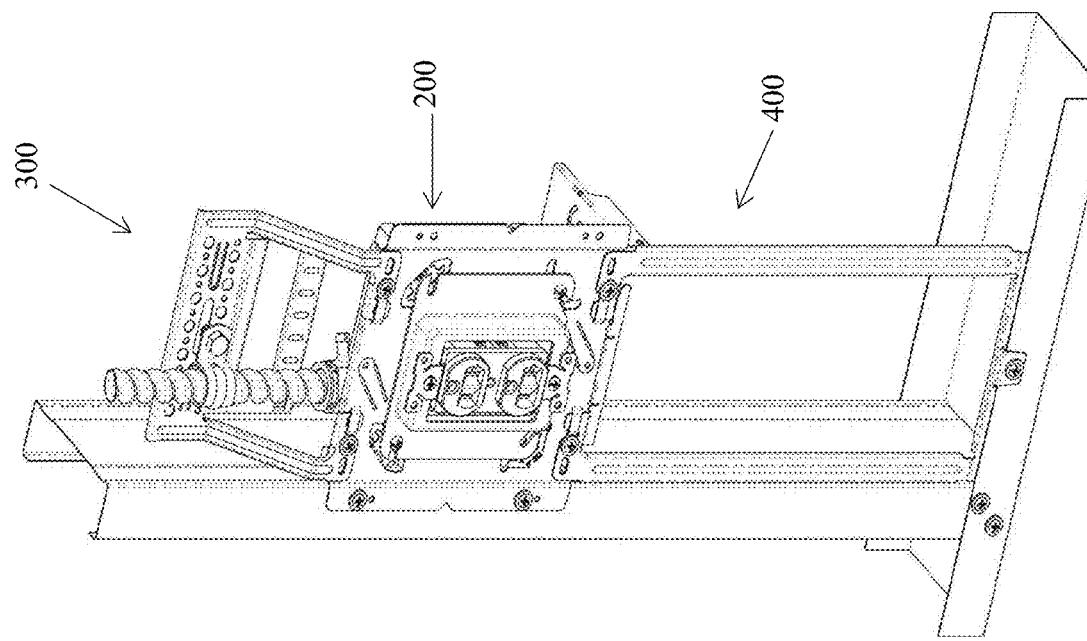
FIG. 14 is a perspective view of a floor support bracket coupled to a box bracket and a conduit support bracket.
Figure 15:
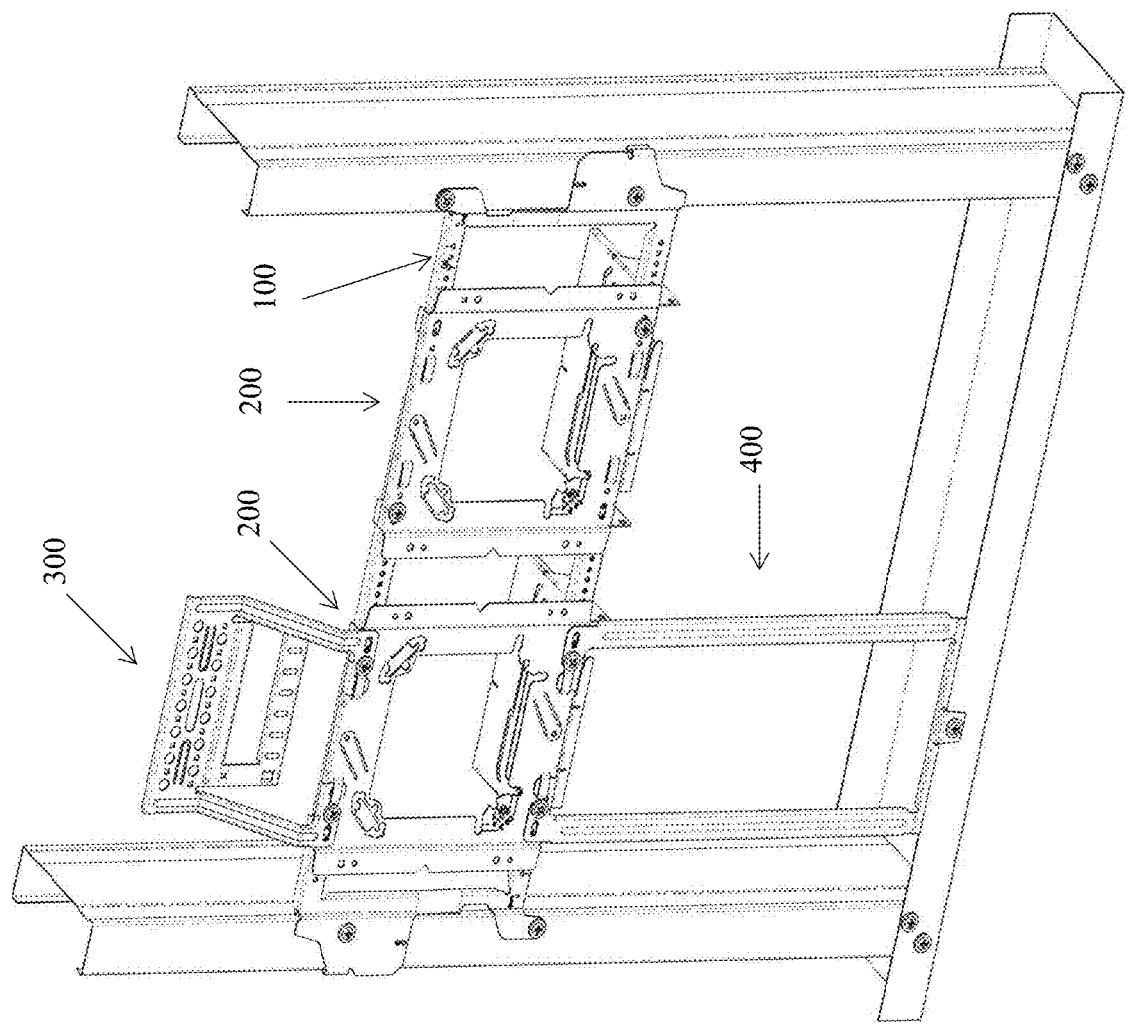
FIG. 15 is a perspective view of a telescoping support bracket with box brackets, conduit support bracket, and floor support bracket connected thereto.

It will be understood by the skilled person that support bracket 100, box bracket 200, conduit support bracket 300, and floor support bracket 400 can be combined in a variety of ways. As an example, in the embodiment illustrated in FIG. 13, floor support bracket 400 is combined with box bracket 200. In the embodiment illustrated in FIG. 14, floor support bracket is combined with box bracket 200 and conduit support bracket 300. In the embodiment illustrated in FIG. 15, support bracket 100 is combined with box brackets 200, which are in turn connected to conduit support bracket 300 and floor support bracket 400.

Having described the invention in detail, it will be apparent that modifications and variations are possible without departing from the scope of the invention defined in the appended claims.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above products without departing from the scope of the invention, it is intended that all matter contained in the above description and shown in the accompanying drawings shall be interpreted as illustrative and not in a limiting sense.

What is claimed is:

1. A telescoping support bracket comprising:
    a first telescoping member and a second telescoping member, wherein the first and second telescoping members are identical, and wherein the second telescoping member is rotated about 180 degrees as compared to the first telescoping member;
    wherein each of the first telescoping member and the second telescoping member comprise:
        two telescoping legs, wherein the two telescoping legs of the first telescoping member are mated with the two telescoping legs of the second telescoping member; and
        a stud-connecting arm including a tab defining a mounting hole, and a clamping flange configured to clamp onto a stud, wherein the tab and the clamping flange are spaced apart heightwise to define a clearance configured to receive the clamping flange of an opposite one of the stud-connecting arms of another one of the telescoping support bracket to mesh stud-connecting arms of two of the telescoping brackets on a same stud without overlapping the stud-connecting arms.

2. The bracket of claim 1 wherein the clamping flanges of the first and second telescoping members each define a second mounting hole.

3. The bracket of claim 2 wherein the clamping flanges of the first and second telescoping members are resiliently deflectable and configured to apply force to the studs to hold the telescoping support bracket on the studs during mounting.

4. The bracket of claim 3 wherein the clamping flanges of the first and second telescoping members comprise indicia indicating a center line of the telescoping support bracket.

5. The bracket of claim 1 wherein the telescoping legs contain a plurality of holes along a length thereof.

6. The bracket of claim 1 further comprising indicia on the two telescoping legs to indicate a length of the bracket at a given configuration.

7. A method of installing the telescoping support bracket of claim 1 on adjacent first and second studs, the method comprising:
    configuring the telescoping support bracket so that a length of the telescoping support bracket is generally parallel to a length of the first stud;
    inserting a fastener into the mounting hole of the tab of the first telescoping member and the first stud to couple the telescoping support bracket to the first stud;
    pivoting the telescoping support bracket upward about the fastener so that the length of the telescoping support bracket is generally transverse to the length of the first stud; and
    inserting a second fastener into the mounting hole of the tab of the second telescoping member and the second stud to couple the telescoping support bracket to the second stud.

8. A box bracket system comprising:
a telescoping bracket comprising:
- a first telescoping member and a second telescoping member, wherein the first and second telescoping members are identical, and wherein the second telescoping member is rotated about 180 degrees as compared to the first telescoping member;
- wherein each of the first telescoping member and the second telescoping member comprise:
  - two telescoping legs, wherein the two telescoping legs of the first telescoping member are mated with the two telescoping legs of the second telescoping member; and
  - a stud-connecting arm including a tab defining a mounting hole, and a clamping flange configured to clamp onto a stud, wherein the tab and the clamping flange are spaced apart heightwise to define a clearance configured to receive the clamping flange of an opposite one of the stud-connecting arms of another one of the telescoping support bracket to mesh stud-connecting arms of two of the telescoping brackets on a same stud without overlapping the stud-connecting arms; wherein the telescoping legs contain a plurality of holes along a length thereof; and
a box bracket comprising:
- a face plate defining slots that allow access to the plurality of holes of the telescoping support bracket; and
- at least one mounting opening.

9. The box bracket system of claim 8 wherein the box bracket further comprises a stud-mounting flange extending laterally outward and disposed on a perimeter of the face plate, wherein the stud-mounting flange defines a fastener opening.

10. The box bracket system of claim 8 wherein the box bracket further comprises a base flange extending rearward from a lower edge margin of the face plate.

11. The box bracket system of claim 8 wherein the box bracket further comprises a bracket clamping flange configured to engage at least one telescoping leg of the telescoping support bracket, wherein the bracket clamping flange is resiliently deflectable and configured to apply force to telescoping support bracket to hold the box bracket on the telescoping support bracket during mounting.

12. The box bracket system of claim 8 wherein the box bracket further comprises at least one strap extending outwardly from the face plate.

13. A conduit support bracket system comprising:
the box bracket system of claim 8; and
a conduit support bracket comprising:
- at least two tabs configured to mate with the strap of the box bracket;
- at least two connection flanges defining a fastener opening corresponding to the fastener opening slot of the box bracket;
- an arm extending upward and rearward from an outer edge of each of the connection flanges;
- a support flange coupled to an edge of the arm opposite of the connection flanges, wherein the support flange is generally parallel to the connection flanges, and wherein the support flange defining at least one opening.

14. The conduit support bracket system of claim 13 wherein the at least two tabs define a space extending therebetween.

15. The conduit support bracket of claim 13 wherein the support flange further comprises a resiliently deflectable arm configured to support a conduit between the deflectable arm and the support flange when the deflectable arm is engaged.

16. The conduit support bracket of claim 13 wherein the at least two connection flanges comprise rearward facing flanges.

* * * * *